US006556531B1

(12) United States Patent
Yagi et al.

(10) Patent No.: US 6,556,531 B1
(45) Date of Patent: Apr. 29, 2003

(54) MULTI-LAYERED HOLOGRAPHIC READ-ONLY MEMORY AND DATA RETRIEVAL METHOD

(75) Inventors: Shougo Yagi, Tokyo (JP); Tadayuki Imai, Tokyo (JP); Michio Ono, Tokyo (JP); Hiroki Yamazaki, Tokyo (JP); Haruki Kozawaguchi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/252,009

(22) Filed: Feb. 16, 1999

(30) Foreign Application Priority Data

Feb. 16, 1998 (JP) .......................................... 10-032578
Feb. 26, 1998 (JP) .......................................... 10-044941
Mar. 24, 1998 (JP) .......................................... 10-075336

(51) Int. Cl.$^7$ ................................................. G11B 7/00
(52) U.S. Cl. ......................... 369/103; 369/286; 385/129
(58) Field of Search ............................. 369/103, 275.1, 369/286

(56) References Cited

U.S. PATENT DOCUMENTS

| | | | | |
|---|---|---|---|---|
| 5,233,582 A | * | 8/1993 | Tanno et al. ............. | 369/100 X |
| 5,285,274 A | * | 2/1994 | Tanno et al. ............. | 369/100 X |
| 5,515,184 A | | 5/1996 | Caulfield et al. | |
| 5,566,387 A | * | 10/1996 | Dewald ...................... | 369/103 |
| 5,835,470 A | * | 11/1998 | Campbell et al. .......... | 369/103 |
| 6,151,287 A | * | 11/2000 | Labeyrie .................... | 369/103 |
| 6,284,437 B1 | * | 9/2001 | Kashyap ..................... | 430/321 |

FOREIGN PATENT DOCUMENTS

| | | | |
|---|---|---|---|
| JP | 2-210626 | 8/1990 | |
| JP | 4-265539 | * 9/1992 | |
| JP | 4-265540 | * 9/1992 | ................. 369/103 |
| JP | 5-107419 | 4/1993 | |
| JP | 5-128323 | 5/1993 | |
| JP | 6-110367 | * 4/1994 | |
| JP | 7160181 | 6/1995 | |
| JP | 9-101735 | 4/1997 | |
| JP | 11224043 | 8/1999 | |

OTHER PUBLICATIONS

English translation of JP 5–107419.*
Dickson et al—Holographic Disc—IBM Tech. disclosure bulletin, vol. 27, No. 2, Jun. 1984.*
Ming Li, et al., "Demonstration of Computer–Generated Waveguide Hologram on InGaAsP–InP Waveguide for 1550–nm Optical Wavelength", IEEE Photonics Technology Letters, vol. 9, No. 7, pp. 958–960, Jul., 1997.
Amnon Yariv, "Optical Electronics ($4^{th}$ edition)", ISBN0–03–047444–2, Saunders College Publishing, pp. 479–487.

* cited by examiner

Primary Examiner—Aristotelis M. Psitos
(74) Attorney, Agent, or Firm—Burns, Doane, Swecker & Mathis, L.L.P.

(57) ABSTRACT

An inexpensive multi-layered holographic read-only memory having a large capacity is provided. In the memory in which single-mode slab waveguides are multi-layered, a periodic scattering center whose period approximately agrees with the period of the guided mode is provided in at least one of a core layer and a clad layer in each waveguide so that a guided wave in the waveguide is diffracted by the periodic scattering center to the outside of the waveguide and a holographic image is generated.

13 Claims, 18 Drawing Sheets

MULTI-LAYERED HOLOGRAPHIC READ-ONLY MEMORY AND DATA RETRIEVAL METHOD

BACKGROUND OF THE INVENTION

1. Field of the Invention

The present invention relates to a multi-layered holographic read-only memory, preferably used as a mobile (or portable) memory card such as a magnetic card and an IC card. This type of card is difficult to forge or reproduce, and thus can be used as an authentication card for electronic commercial transaction. Additionally, the present memory has a large capacity and can be manufactured at low cost, and thus is suitable for distributing software for music, pictures, computer applications, or the like.

This application is based on Patent Applications Nos. Hei 10-32578, Hei 10-44941, and Hei 10-75336 filed in Japan.

2. Description of the Related Art

Magnetic cards such as a telephone card are conventionally used as mobile (or portable) information cards which a user can carry in a pocket. Recently, IC cards have become practical to use, and application of the IC cards to the electronic commercial transaction has been investigated. The magnetic cards are cheap, but may be forged. The IC cards are difficult to forge, but their cost per bit is expensive.

The holographic storage technique is another technique applicable to a data memory which is difficult to forge and has a large capacity. Holography can be classified into thin film holography and volume holography.

A volume holographic memory has a larger storage capacity; however, no data duplication technique suitable for the volume hologram exists. Therefore, this type does not suit mass production, and it is difficult to apply the volume holography to a read-only memory used as an authentication card or used for distributing software applications.

A thin film hologram can be mass-produced using a printing technique, but has a limited memory density. Therefore, in consideration of the size and convenience of a necessary data retrieval device, the memory using thin film holography has less appeal in comparison with the IC card. Even if such thin film holograms are multi-layered so as to solve the above problem and to increase the storage capacity, holographic images, reconstructed from each hologram by using an ordinary reconstruction method, are simultaneously reconstructed. Therefore, due to the crosstalk being large, necessary data or information cannot be obtained.

SUMMARY OF THE INVENTION

An objective of the present invention is to provide an inexpensive multi-layered holographic read-only memory having a large capacity, which is applicable to a mobile card or a storage medium used in a data storage device. Another objective is to provide a multi-layered holographic read-only memory by which the data-retrieval speed can be improved.

In order to realize the above objective, the present invention provides a multi-layered holographic read-only memory in which single-mode slab waveguides are stacked to be multi-layered, wherein a periodic scattering center whose period approximately agrees with the period of the guided mode is provided in at least one of a core layer and a clad layer in each waveguide so that a guided wave in the waveguide is diffracted by the periodic scattering center to the outside of the waveguide and a holographic image is generated.

That is, the principle of the thin film holography is used, and the hologram based on this is difficult to forge while it can be mass-produced. In the present invention, such thin film holograms are multi-layered, and the holographic image of each layer can be individually reconstructed.

In the general thin film holography, even if the incident direction or wavelength of a beam for reconstructing the image (i.e., a reference beam) is changed so as to change the position, magnification, or diffraction direction of the reconstructed image, the reference beam is always diffracted. That is, in the multi-layered thin film holograms, as far as the reference beam reaches each thin film hologram, crosstalk is inevitable regardless of the incident direction of the reference beam. In the present invention, each thin film hologram is embedded in the waveguide and the guided wave functions as a reference beam, thereby preventing the reference beam from reaching holograms other than the target hologram.

Therefore, in the present invention, the data storage capacity can be increased like the volume holographic memories while the principle of the thin film holography suitable for mass production can be used. Accordingly, an inexpensive read-only memory having a larger storage capacity can be realized. If the present memory is applied to a portable memory card, a rotating mechanism employed in the optical disc or the like is unnecessary; thus, power necessary for the retrieval device (for retrieving musical or video data) can be reduced. If the present memory is applied to an authentication card, the card is difficult to forge and various additional information data can also be stored therein. Therefore, convenience can be improved.

Typically, at least one of the edges of the multi-layered slab waveguide is cut so as to produce a reflecting surface which is slanted (or inclined) by approximately 45° with respect to the normal direction of the waveguide plane, and light is incident from the direction substantially perpendicular to the waveguide plane on the reflecting surface so as to introduce the light into the waveguide. If the multi-layered slab waveguide has opposite edges, both the edges may function as 45°-cut reflecting surfaces, and light-introducing (or coupling) positions can be determined such that guided waves incident from these edges do not overlap with each other in the relevant waveguide plane. Furthermore, a plurality of the multi-layered slab waveguides may be placed and bonded with each other in the waveguide plane so as to make a card.

According to such variations, possible areas for storing readable data as holograms can be increased; thus, the storage capacity can be increased, and the data retrieval speed can be improved. If the present invention is applied to a portable card, the effective storage area can be increased depending on the total area of the card.

On the other hand, the multi-layered slab waveguide may have a disc shape, and a light-introducing section may be provided in a central area of the disc, so as to guide light towards the outer circumference of the disc.

Typically, the light-introducing section is a reflecting surface having the shape of a 45°-slanted side face of a cone, and light can be incident from the direction substantially perpendicular to the disc plane on the reflecting surface so as to introduce the light into the waveguide.

In this case, the following arrangement is possible: a plurality of coupling points for introducing light are concentrically and periodically placed in the reflecting surface; a guided wave is transmitted from each coupling point towards the outer circumference of the disc while the guided wave expands as a fan-shape having a predetermined angle of expansion; and the predetermined angle of expansion is determined in order that fan-shaped portions corresponding to each coupling point do not overlap with each other.

In the above arrangement, the coupling points are circularly concentrated near the center of the disc. Therefore, with a single head above the circumference of the circle of the coupling points, the waveguide of each fan-shape portion can be accessed in turn by rotating the disc, and it is efficient.

Generally, a rotational data-retrieval device has a much simpler structure and a higher access speed in comparison with a linear mechanical-motion data-retrieval system. When the target layer is changed, the lens of a light source must be moved also in this case (like the card type). However, in the rotational data-retrieval device, the requirement for the necessary moving distance is 1 mm at the most. A precise micro-motion mechanism (i.e., actuator) necessary for such a stroke is widely used for optical discs or the like, and is not expensive. In addition, such a micro-motion mechanism has a short response time of approximately 1 ms.

When data stored in the disc memory are retrieved by rotating the disc, it is possible to extract a non-diffracted portion of the guided wave outside of the memory so as to establish a synchronous condition in the rotation.

Consequently, according to the present invention, both the possible data-storage area of the hologram and the data-retrieval speed can be remarkably improved.

Japanese Patent Application, First Publication, No. Hei 9-101735 discloses a data retrieval technique using multi-recorded holograms. In this case, a part of or the whole of the holograms is made of an optical recording material, and data are recorded using the optical interference. Data are retrieved using a reference beam. However, every object beam passes through all the layers during the recording of each hologram. Here, exposure of a specific intensity must be performed so as to obtain the necessary signal intensity. In this method, the S/N ratio is decreased in inverse proportion to the square of the number of layers. In contrast, in the present invention, the hologram is provided in advance for each target layer, and data are retrieved using the guided wave, as described above; thus, the S/N ratio is merely decreased in inverse proportion to the number of layers. That is, Hei 9-101735 has different structure and functions in comparison with the present invention, and has an essential problem with respect to the multi-layered structure.

DESCRIPTION OF THE PREFERRED EMBODIMENTS

Hereinbelow, embodiments according to the present invention will be explained with reference to the drawings; however, the present invention is not limited to the embodiments, and various variations and modifications are possible.

First Embodiment

Figure 1:
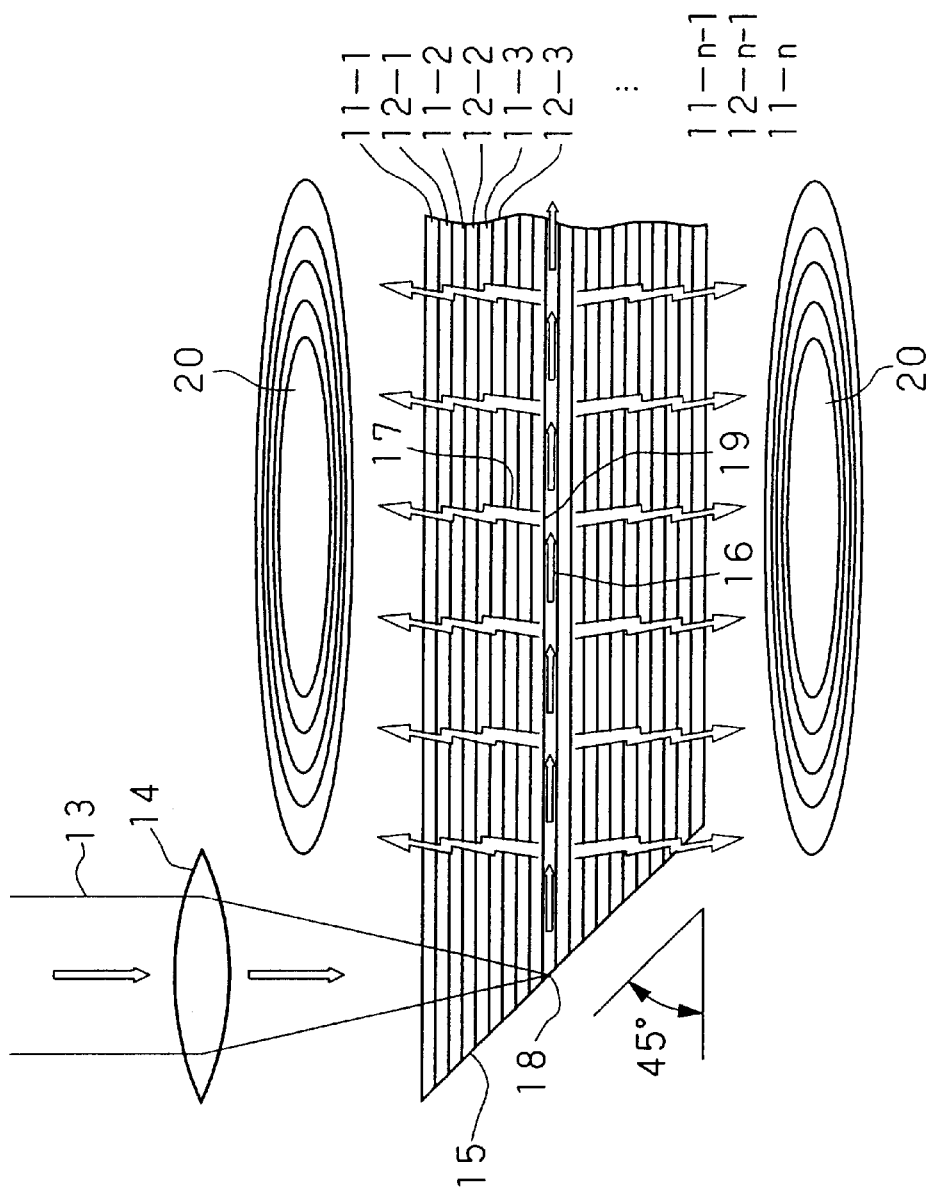
FIG. 1 is a diagram explaining the structure of the multi-layered holographic read-only memory card and the method for inputting and outputting a light beam in the first embodiment according to the present invention.

FIG. 1 is a diagram explaining the structure of the multi-layered holographic read-only memory card and the method for inputting and outputting a light beam in the first embodiment.

As shown in FIG. 1, this card has a periodic structure consisting of "cladding 11-1/core 12-2/cladding 11-2/core 12-2/ . . . /cladding 11-n". Each unit of "cladding/core/cladding" functions as a single-mode slab (or thin film) waveguide at the wavelength of laser 13 to be used. The core of this slab optical waveguide is made of a transparent material such as quartz or polymeric materials, and has a plate shape, and each core is put between materials having a lower refractive index. In this structure, light can be confined inside the core and be transmitted in a direction within the relevant plane; thus, this waveguide can be applied to a component used in optical communication. That is, in the multi-layered holographic read-only memory card, such slab waveguides are stacked to be multi-layered and each waveguide layer comprises a hologram, as explained later.

Here, reference numeral 14 indicates a convex lens; however, a cylindrical lens may be used. At least one of the edges of the multi-layered slab waveguide is reflecting surface 15, the angle of which, with respect to the direction perpendicular to the waveguide plane (i.e., the normal direction), is 45°. The position of convex lens 14 is adjusted so that the focus of the retrieval laser beam 13 is positioned at the 45°-cut core portion of a target waveguide.

If the reflecting surface 15 is exposed, the total reflection is observed, and no particular reflective layer is necessary. However, if the reflecting surface is protected using a resin or the like so as to produce resistivity, a dielectric or metallic layer should be formed as a reflective layer.

In order to couple laser beam 13 to the waveguide, the NA (numerical aperture) of the convex lens 14 should be smaller than or equal to that of the waveguide.

However, with a smaller NA, the focal spot of the lens is larger. Therefore, in the case of using a single-mode waveguide, if a laser beam is directly focused from the air onto the waveguide, the spot size is always larger than the width of the waveguide, and the coupling efficiency of 100% cannot be achieved.

The NA of the lens (i.e., $NA_L$) is defined as follows:

$$NA_L = D/\sqrt{f^2 + D^2}$$

where the diameter of lens is 2D, and the focal length of lens is f, and the NA of the waveguide (i.e., $NA_{WG}$) is defined as follows:

$$NA_{WG} = \sqrt{n_a^2 - n_c^2}$$

where the refractive index of the core is $n_a$, and the refractive index of the cladding is $n_c$.

As shown in FIG. 1, the light beam incident from the reflection point 18 onto the waveguide is converted to guided wave 16, which travels mainly within the core of the waveguide while the light beam expands as a fan-shape, the pivot of which is the reflection point (the coupling point of the guided wave) 18. Here, the angle of the expansion is "$2 \sin^{-1}(NA_L)$" which is variable according to the kind of convex lens 14. If a cylindrical lens is used as the lens 14, the guided wave travels with a fixed width, and does not expand as a fan-shape.

The guided wave 16 is partially scattered due to a scattering center (here, hologram) provided in the core or clad layer, and the scattered portion escapes outside the waveguide. If scattering center 19 has periodicity, there is a direction in which the scattered light will be in phase, and in turn, this scattered light is referred to as diffracted light 17 traveling in this direction. That is, the light is also diffracted outside the waveguide, thereby generating holographic image 20. This holographic image can be detected using a two-dimensional detector such as a CCD (charge coupled device) so that (information) data are retrieved. In addition, by shifting the convex lens 14 in FIG. 1, the target waveguiding layer can be changed; thus, data stored in a selected or target layer can be retrieved.

In FIG. 1, if the scattering center is provided at the interface between the core land clad layers, or in one of these layers, in either case the diffracted light is output in both upward and downward directions.

Actually, the above periodic scattering center is a periodic rough pattern or a periodic modulation of the refractive index existing in the interface between the core and clad layers. However, another type of the periodic scattering center for partially leaking the guided wave may be used. As a practical example, the refractive index, absorptance, or thickness of the core is modulated in accordance with the hologram pattern, and the easiest method among these is the modulation of the thickness. For example, a previously-calculated concavo-convex pattern for fabricating a desired hologram is formed on a master plate made of a hard material such as metal, and the concavo-convex pattern is transferred to a plastic polymeric sheet by employing the above master plate and using a printing technique. This plastic polymeric sheet is used as a core and a cladding. Accordingly, mass production of media storing the same contents (or information) is possible, as the conventional media such as CDs.

In order to reduce crosstalk, it is important that the diffraction efficiency with respect to the hologram is set to be small, such as 0.1%. As another method, a UV (ultraviolet) curable resin is used as a material for the core or cladding, and pattern irradiation using the UV is performed. It is also possible to draw a periodic refractive-index modulation pattern by using the electron impingement.

The following is an explanation of the parameters such as the refractive index and the thickness of each layer, used for implementing the above-described concepts for the light coupling to the waveguide, the light traveling in a single-mode waveguide, and the generation of an holographic image. Here, $\lambda$ indicates the wavelength of laser beam 13, $n_a$ and $d_a$ respectively denote the refractive index and the thickness of the core, and $n_c$ and $d_c$ respectively denote the refractive index and the thickness of the cladding. It is necessary to select a material of a small absorptance for both core and cladding.

The condition necessary for a single-mode waveguide is indicated by the following formula (1).

$$d_a < \lambda/2\sqrt{n_a^2 - n_c^2} \qquad (1)$$

If Polymethyl methacrylate, that is, PMMA ($n_a$=1.492) is selected for the core, a UV curable resin ($n_c$=1.480) is selected for the cladding, and a semiconductor laser of wavelength ($\lambda$) of 680 nm is used as a light source, then the thickness of each core must be smaller than 1.8 $\mu$m.

When the above refractive indices are selected, $NA_{WG}$, the NA of the waveguide, is 0.189. If $NA_L$ (the NA of the lens) is set to be the same value, that is, 0.189, then the spot size of the focus is 4.3 $\mu$m, which corresponds to the diameter of the Airy disc "$1.2\lambda/NA_L$". This value is larger than 1.8 $\mu$m that is, the thickness of the core layer; thus, the coupling efficiency is (i) 71% in the case using a circular convex lens, or (ii) 77% in the case using a cylindrical lens.

Hereinbelow, the directional coupling between layers in the multi-layered waveguides will be explained. It is assumed that pairs of "cladding/core" are periodically multi-layered, and a light beam is input only into the j-th layer so that the beam travels in the z direction. While the light beam is wave-guided in the z direction, light gradually leaks into adjacent cores. This phenomena is called directional coupling.

The amplitude of the j-th layer and the amplitude ($A_{j\pm n}$) of neighboring (j±n)th layer are indicated by the following functions with respect to z:

$$A_j = E_0 J_0(\kappa z)$$

$$A_{j\pm n} = E_0 J_n(i\kappa z)$$

where $E_0$ means the initial amplitude of the input light beam, and $J_m$ indicates the m-th order Bessel function. Symbol "$\kappa$" is defined as the following formula using guided mode $W_j$ of the jth layer, $W_j$ being defined when the core exists only in the jth layer:

$$\kappa = ((n_a^2 - n_c^2)\lambda/(2\pi))<W_j|W_{j-1}> \qquad (2)$$

where $\lambda$ indicates the wavelength, $n_a$ means the refractive index of the core, $n_c$ denotes the refractive index of the cladding, and "$<W_j|W_{j-1}>$" indicates a value obtained by spatially integrating "$W_j \times W^*_{j-1}$" with respect to the (j−1)th core. Here, $W^*_{j-1}$ is the complex conjugate of $W_{j-1}$, and $W_j$ is a normalized value so that the integration of "$W_j W^*_j$" over the entire space becomes a unity.

In the present embodiment, the above described strict conditions are unnecessary, but one condition necessary for reducing the crosstalk is that only contributions to adjacent layers ($A_{j\pm n}$) must be considered. When "κz" is small, the following relationship is obtained:

$$A_{j\pm n} \approx i\kappa z/2$$

Therefore, in order to reduce crosstalk due to the directional coupling, "κL" must be sufficiently smaller than 1, where L denotes the waveguide length.

For example, when $n_a=1.492$, $n_c=1.480$, the thickness of the core is 1.7 μm, and the thickness of the cladding is 6 μm, κ is approximately 0.18 m$^{-1}$. Therefore, the coupling to a neighboring layer at the wave-guided distance of 5 mm is approximately 0.1% in the amplitude base, or approximately $10^{-4}$% in the intensity base. It is obvious that these levels are sufficiently small. That is, when the wave-guided distance is short, such as a few millimeters, crosstalk due to directional coupling is sufficiently small to be ignored.

On the other hand, when laser beam 13 is focused on a predetermined reflection point 18, if the difference between the refractive indices of the cladding and the core is small, then the reflection loss in the multi-layers of "cladding/core/cladding/core/ . . . " has a sufficiently small value to be ignored in comparison with the coupling loss between the lens and the waveguide.

In the above example ($n_a=1.492$ and $n_c=1.480$), even if a most undesirable thickness is obtained due to an interference effect, the reflectance for each pair of "cladding/core" is on the order of $10^{-5}$. That is, even if a laser beam vertically passes through 100 units of the waveguide layers, transmittance of 99% or more can be maintained. The portion having the largest reflection loss is the interface between the air and the uppermost clad layer, and this interface has the reflectance of 3.9% at the most. The above-explained fact that the reflection loss (effect) can be ignored is also applied to the diffracted light, that is, light diffracted towards a direction nearly perpendicular to the waveguide plane is not much affected by the multi-layers. In addition, if the original diffraction efficiency is set to be low, re-diffraction of the diffracted light, caused by a periodic scattering center existing in another layer, can be sufficiently small to be ignored. That is, with the original diffraction efficiency η, the maximum quantity of re-diffracted light is $\eta^2$ for each layer. If $\eta=0.5\%$, then $\eta^2=2.5\times 10^{-5}$. Therefore, even if the most undesirable case, in which all of the 100 layers have the maximum re-diffraction, is assumed, the diffraction efficiency merely becomes half ($2.5\times 10^{-5}\times 100=0.25\%$).

The storage capacity depends on the wavelength (λ), the area of the card (S), and the number of layers (L). If error correction is not considered, the storage capacity is approximately $S\times L\times \lambda^{-2}$. Therefore, when using a visiting (or credit) card size (S=5.4×9=48.6 cm$^2$) medium having a thickness of 1 mm (L≈100) and a red semiconductor laser (λ=680 nm), the storage capacity of 131 GB (giga byte) is obtained. Therefore, even if error correction codes are used and thus the possible capacity for storing information is decreased, approximately 100 GB can be secured. This capacity is obviously large in comparison with 4.7 GB which is the storage capacity of DVDs (Digital Video or Versatile disc).

Hereinbelow, the periodic scattering center will be explained in detail. First, necessary periodicity will be explained. When the propagation constant β of the waveguide is indicated by "2π/λ'" (λ' indicates the length corresponding to the period of the guided mode), "Λ" denotes the length corresponding to the period of the scattering center, and λ indicates the light wavelength in vacuum, the angle θ between the wave-guiding direction and the direction in which the diffracted light proceeds is represented by the following formula (3):

$$\cos\theta = \lambda(1/\lambda' - 1/\Lambda) \tag{3}$$

Here, if it is assumed that the guided wave travels in the z direction and that the light confinement is effective in the x direction, the amplitude of the electric field of the guided wave is represented as follows (refer to Amnon Yariv, "Optical Electronics (4th edition)", ISBN0-03-047444-2, Saunders College Publishing, pp. 479–487):

$$A(x, y, z, t) = A'(x)\exp i(\beta z - \omega t) + A'^*(x)\exp -i(\beta z - \omega t)$$

The propagation constant (β) is defined based on the above formula. That is, if the period of the scattering center is the same as the period of the guided mode, the light is almost perpendicularly diffracted. If the multi-layered holographic read-only memory card according to the present invention is manufactured using a material such as a polymeric material, the change of the period of the scattering center due to the thermal expansion, that is, the following formula (4) must be considered.

$$\Lambda = \Lambda_0 + \xi\delta T \tag{4}$$

where ξ indicates the coefficient of linear expansion and δT indicates the change of temperature. If θ≈π/2, then the change δθ of diffracted angle is indicated by the following formula (5):

$$\delta\theta \approx -\lambda\xi\delta T/(\Lambda\sin\theta) \tag{5}$$

where the range of ξ is $10^{-4}$ to $10^{-5}$ K$^{-1}$. Therefore, if δT=±20° C., the change of the diffracted angle is $2\times 10^{-3}$ rad (±0.1°) or less, regardless of the size of the relevant hologram. The above change of the diffracted angle is small. However, when the fineness of the hologram pattern is improved, a small change of the diffraction angle may affect the data retrieval; thus, the retrieval device must be carefully designed. For example, if the diffracted light is directly coupled as a real image with the CCD (charge coupled device), each pixel of which has an area of 5 μm×5 μM, then the distance between the holographic card and the CCD must be sufficiently smaller than 2.5 mm.

Here, a simple periodic scattering center may be insufficient for generating actual data for desired information. That is, practically, it is necessary to prepare a scattering center which is designed so as to generate a desired image at the receiving element. When the amplitude of the electric field with respect to a desired distribution of light intensity on the CCD is indicated by $E(r_D)$, the amplitude of the electric field of light guided in the holographic card is indicated by $W(r_W)$, and the spatial distribution of scattering intensity of the scattering center is indicated by $S(r_W)$, the $S(r_W)$ should be previously determined so as to satisfy the following formula (6).

$$E(r_D) = \int S(r_W)W(r_W)\exp(i(2\pi/\lambda)|r_W - r_D|)dr_W \tag{6}$$

where $r_W$ and $r_D$ respectively indicate position vectors on the waveguide plane and the CCD light-receiving plane, and "$|r_W - r_D|$" indicates the distance between $r_W$ and $r_D$. As described above, the spatial distribution $S(r_W)$ is produced using a concavo-convex distribution, a refractive-index distribution, or the like, and must be carefully designed so as to generate the necessary diffracted optical pattern. Here, for convenience of explanation, it is assumed that a plane wave is diffracted towards a direction perpendicular to the waveguide plane, and the necessary concavo-convex pattern and refractive-index distribution will be estimated below. The concavo-convex distribution corresponds to a refractive-index distribution related to two kinds of refractive indices of the cladding and core; thus, only the refractive-index distribution will be explained here.

Figure 2:
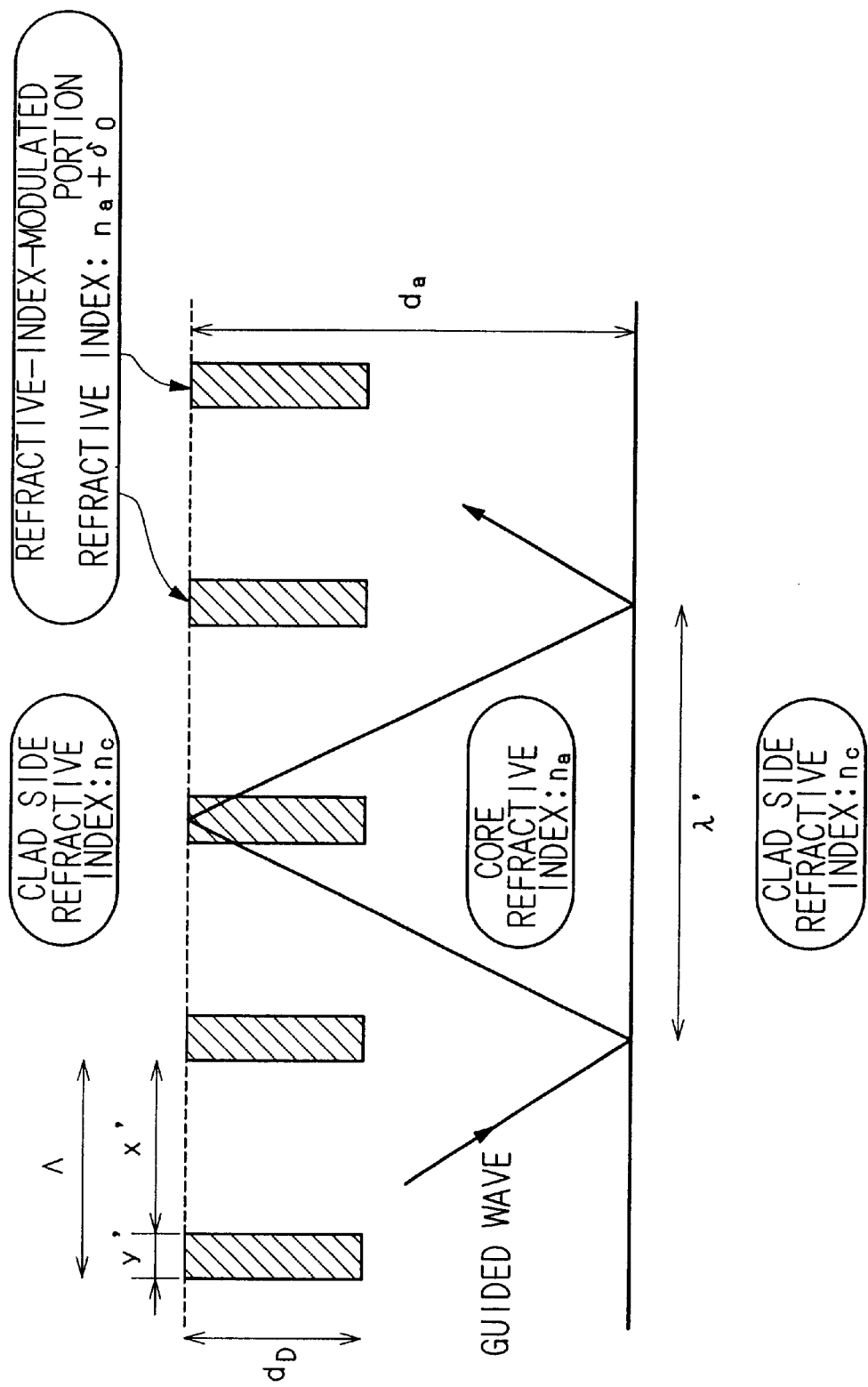
FIG. 2 is a diagram explaining the periodic scattering center of the present invention.
Figure 3:
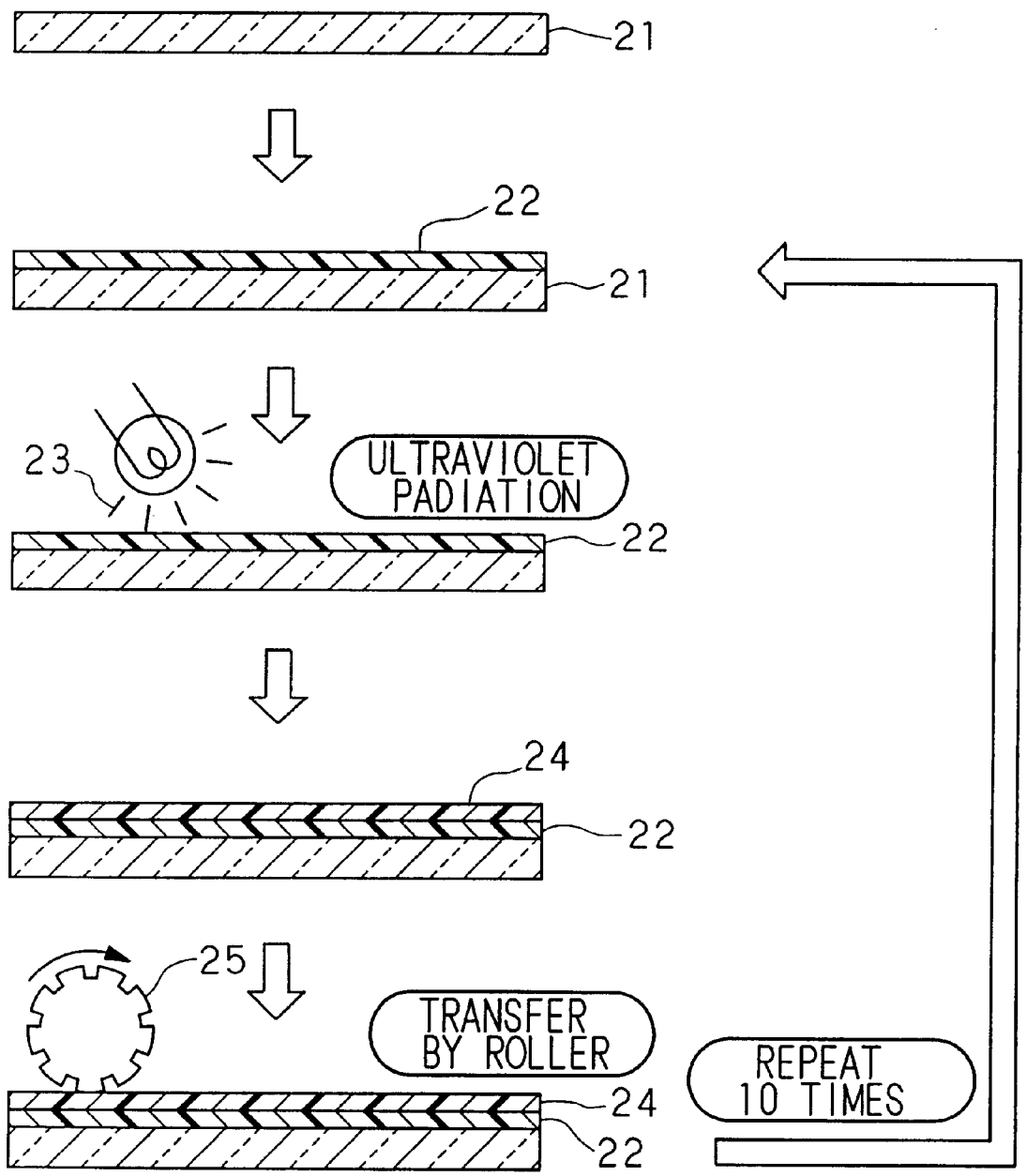
FIG. 3 is a diagram explaining example processes of manufacturing the multi-layered holographic read-only memory card as an example in the first embodiment according to the present invention.

FIG. 2 is a diagram explaining the periodic scattering center.

As shown in FIG. 2, when the variation of the refractive index is indicated by $\delta_0$ and the thickness of the structure related to the refractive-index distribution is indicated by $d_D$, the diffraction efficiency ($\eta$) is represented by the following formula (7) while the diffraction efficiency is small:

$$\eta \approx (\delta_0 r L d_D/(\Lambda d_a))^2 \qquad (7)$$

where r indicates the duty of the refractive-index modulation and L indicates the length of the waveguide. If the scattering center is fabricated by providing a concavo-convex pattern in a core, each concave portion is filled with the material of the cladding; thus, $\delta_0$ is given by "$n_c - n_a$". With distance x' between adjacent portions of the periodic scattering center and width y' of each portion of the scattering center, the following relationships are defined:

$x = x'/\Lambda$ $y = y'/\Lambda$ $1/r = (1/2)(1/x + 1/y)$

As for a typical example in which $n_a = 1.492$, $n_c = 1.480$, the thickness of the core $d_a = 1.7\,\mu m$, and the wavelength of light $\lambda = 680$ nm, the length $\lambda'$ corresponding to the period of the guided mode is 0.46 $\mu m$. Therefore, if the length ($\Lambda$) corresponding to the diffraction period is adjusted to satisfy the condition "$\Lambda = \lambda'$" and if $r = 0.1$, $L = 2$ mm, and $d_D = 0.05$ $\mu m$, then the diffraction efficiency is approximately 0.6%.

On the other hand, if a periodic refractive-index distribution is fabricated by irradiating the core layer with an ultraviolet ray, and if a waveguide having the structure similar to that in the previous example is used and $r = 0.5$, $d_D = d_a$, $L = 5$ mm, and $\delta_0 = 10^{-5}$, then the diffraction efficiency is approximately 0.3%.

In order to form a master plate for the above concavo-convex information pattern, a highly-developed precision technique is necessary; thus, it is difficult to forge the present memory card in comparison with magnetic cards which can be easily manufactured using a magnetic head.

EXAMPLE 1

FIG. 3 and FIGS. 4A to 4C are diagrams explaining example processes of manufacturing the multi-layered holographic read-only memory card according to the present invention.

The present card has a multi-layered structure of a UV curable resin and a PMMA such as "UV curable resin/PMMA/UV curable resin/PMMA/UV curable resin/ . . . /PMMA/UV curable resin", and the UV curable resin has the refractive index of 1.480 and the thickness of 8 $\mu m$, while the PMMA has the refractive index of 1.492 and the thickness of 1.7 $\mu m$.

In the manufacturing, first, the surface of a 1 inch×1 inch optically-polished glass substrate 21 is spin-coated with UV curable resin 22 to a thickness of 8 $\mu m$, and then the coated surface is exposed to ultraviolet ray 23. After this operation, the coated surface is further spin-coated with PMMA 24 to a thickness of 1.7 $\mu M$, and roller 25 having a concavo-convex pattern, the length corresponding to the period of which is 0.46 $\mu m$, is rolled on the coated surface.

Figure 4A:
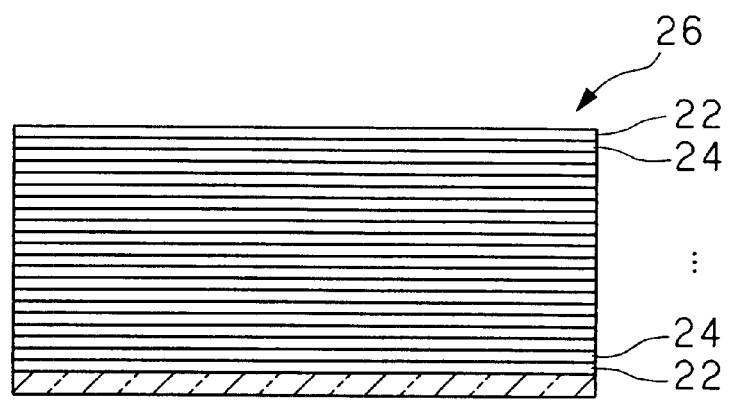
FIGS. 4A to 4C are diagrams explaining the following processes of manufacturing the multi-layered holographic read-only memory card in the first embodiment.

Next, the 4-step process such as this "coating with UV curable resin/ultraviolet exposure/coating with PMMA/rolling operation" is repeated 10 cycles, and as the last process, the operation "coating with UV curable resin→ultraviolet exposure" is performed once, thereby obtaining slab waveguide 26 having a periodic structure as shown in FIG. 4A. In this case, the UV curable resin layer functions as the cladding while the PMMA layer functions as the core, and a concavo-convex pattern functioning as the periodic scattering center is fabricated in each core layer.

Figure 4B:
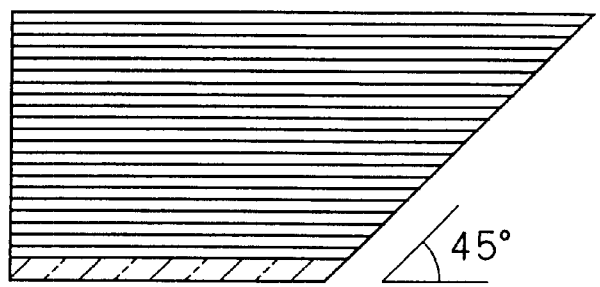

After the above operations, one of the edges is polished to an inclination of 45°, as shown in FIG. 4B. A semiconductor laser of wavelength 680 nm is used as a light source, and the laser beam is collimated via a collimator lens into a collimated beam having the diameter of 5 mm. The collimated beam is then converged using cylindrical lens 27 having the focal length of 13 mm.

Figure 4C:
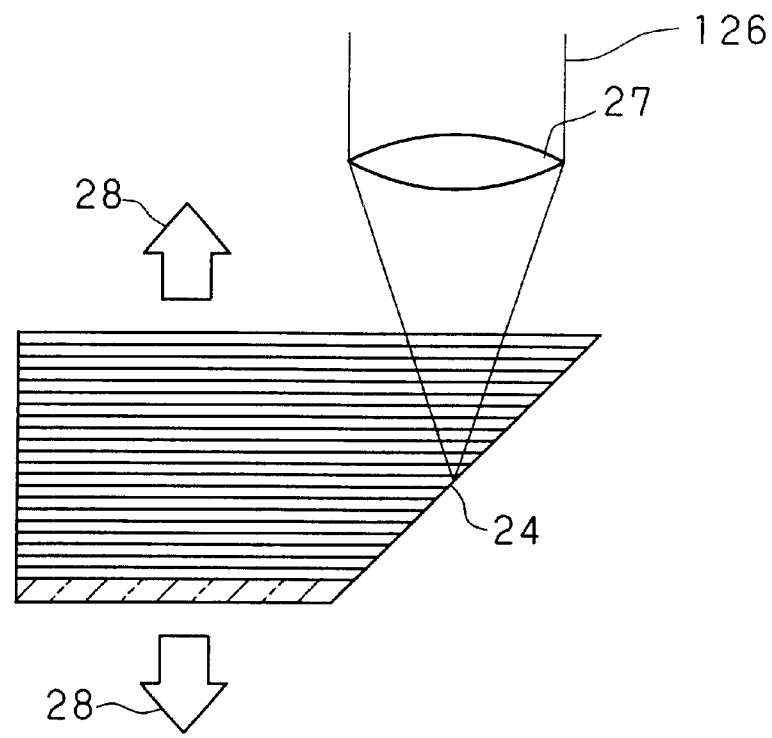

As shown in FIG. 4C, the laser beam 126 is focused at the 45'-cut position of a target PMMA layer so that diffraction light 28 can be observed in the upward and downward directions.

EXAMPLE 2

After portions other than the slanted edge of the holographic memory card manufactured in the above example 1 are covered with an aluminum foil, aluminum is vapor-deposited in a vacuum atmosphere. The aluminum foil is then peeled in the air, thereby forming an aluminum reflecting film on the 45°-cut portion. This 45°-cut portion is further coated with a UV curable resin and irradiated with an ultraviolet ray so as to protect the cut portion. As in the above example 1, a beam of the semiconductor laser of 680 nm is converged onto each PMMA layer by using a lens having a focal distance of 13 mm, thereby generating the diffracted light in the upward and downward directions.

EXAMPLE 3

FIGS. 5, 6A to 6C are diagrams explaining processes of manufacturing the multi-layered holographic read-only memory card as another example according to the present invention, by using the patterning of a UV curable resin.

The multi-layered structure of the holographic card of this example has a unit consisting of three kinds of UV curable resins such as "/UV-A/UV-B/UV-C/", and the structure is "unit-1/unit-2/ . . . /unit-n/UV-A", where n=4 in this example.

The UV-A has a refractive index of 1.480 and a thickness of 8 $\mu m$, the UV-B has a refractive index of 1.492 and a thickness of 1.5 $\mu m$, and the UV-C has a refractive index of 1.475 and a thickness of 0.2 $\mu m$.

Figure 5:
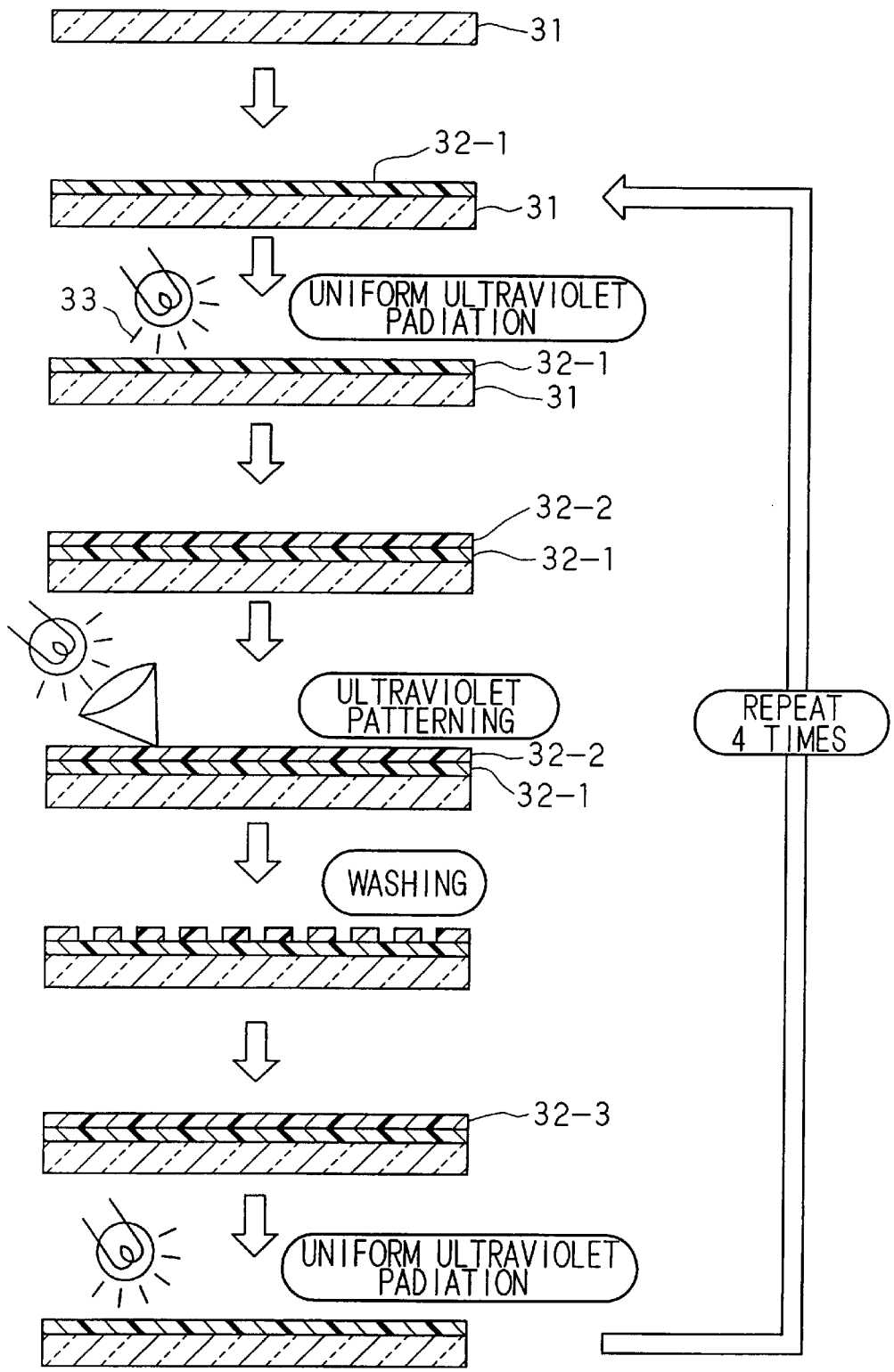
FIG. 5 is a diagram explaining example processes of manufacturing the multi-layered holographic read-only memory card as another example in the first embodiment, by employing the patterning method using a UV curable resin.
Figure 6A:
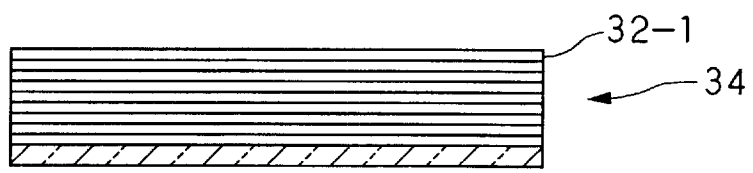
FIGS. 6A to 6C are diagrams explaining the following processes of manufacturing the multi-layered holographic read-only memory card in the first embodiment.

In the manufacturing processes as shown in FIG. 5, first, glass substrate 31 is spin-coated with UV-A (indicated by reference numeral 32-1) to the thickness of 8 $\mu m$, and then ultraviolet ray 33 is uniformly radiated onto the substrate. Next, the above coated surface is further spin-coated with UV-B (indicated by reference numeral 32-2) to the thickness of 1 $\mu m$, and then the patterning using ultraviolet ray 33 is performed. Uncured portions are washed and removed using an ether solvent. Then, the substrate is further spin-coated with UV-C (indicated by reference numeral 32-3), and the ultraviolet ray is uniformly radiated onto the substrate. The set of the above processes is repeated by 4 cycles, and then the set of spin-coating using UV-A (32-1) and the ultraviolet exposure is performed once, thereby obtaining slab waveguide 34 having a multi-layered structure as shown in FIG. 6A.

Figure 6B:
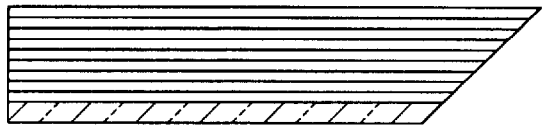
Figure 6C:
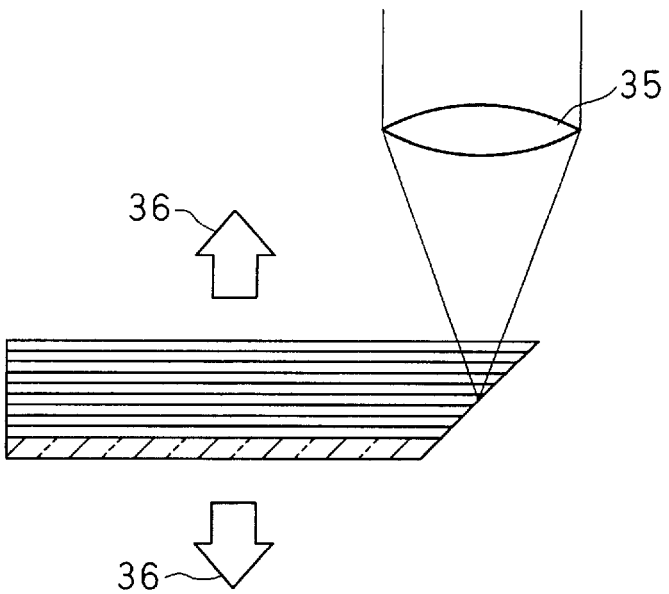

After the above operations, one of the edges is polished to an inclination of 45°, as shown in FIG. 6B. A semiconductor laser of wavelength 680 nm is used as a light source, and the laser beam is collimated via a collimator lens into a collimated beam having a diameter of 5 mm. The collimated beam is then converged, by using a plano-convex lens 35 having a focal length of 20 mm, at the 45°-cut position of each UV-C layer, so that diffraction light 36 can be observed in the upward and downward directions.

In the above-described examples, resin is used as a main material. In this case, mass production using a stamper is possible at low cost (the stamper cannot be used for the medium based on the volume holography). However, glass or the like may be used instead of resin.

The angle of the reflecting surface, at which light is incident, is not limited to 45°, but any angle is possible. That is, any incident direction of light can be selected.

Figure 7:
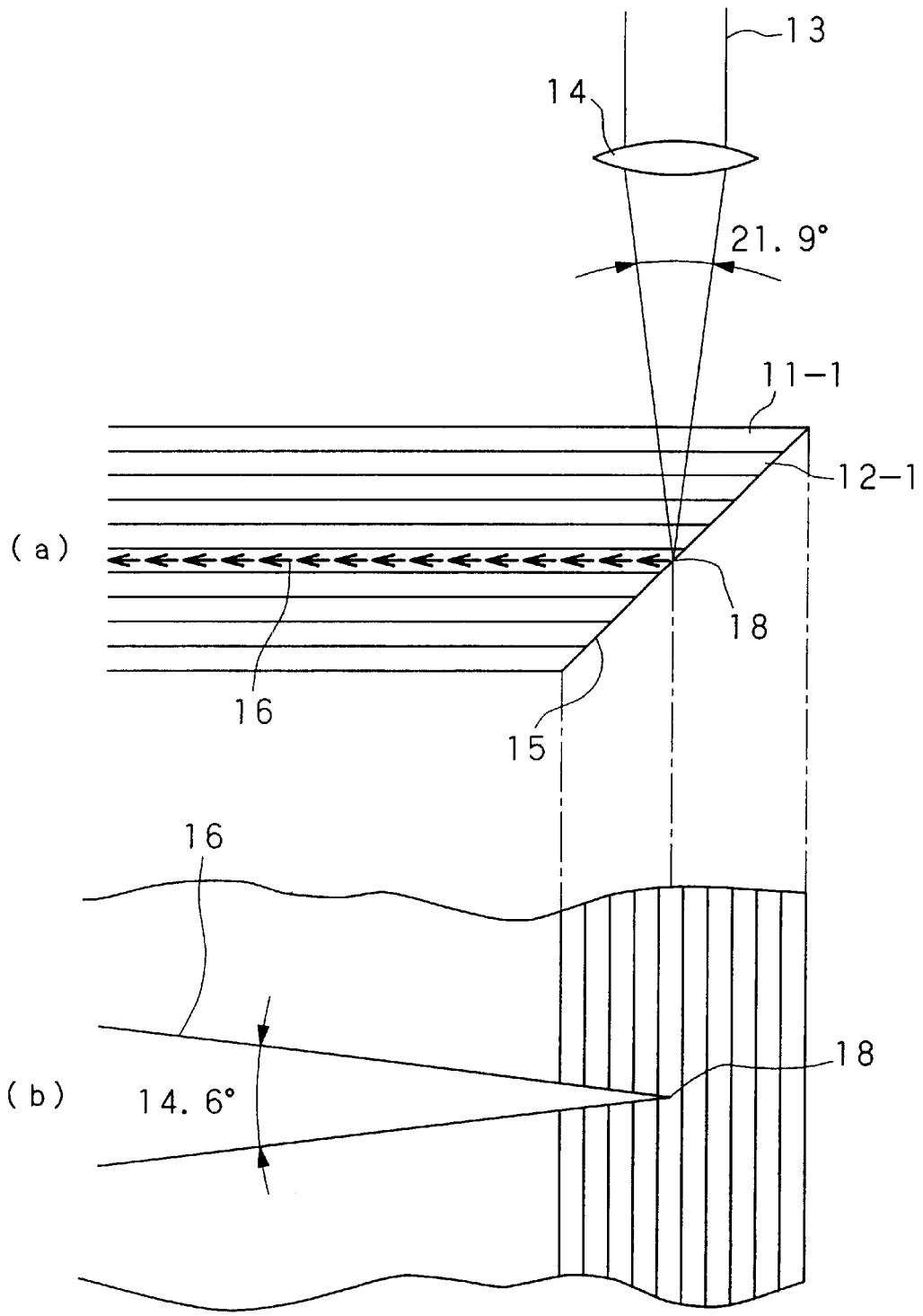
FIG. 7 is a diagram explaining the traveling state of a guided wave.

FIG. 7 is a diagram explaining the state of travel of a guided wave. In the figure, part (a) shows the section of the waveguide and the arrangement for retrieving data, as shown in FIG. 1, and part (b) is a perspective view observed from the topside of the card.

As shown in the part (b), in the above first embodiment, laser beam 13, coupled with the slab waveguide by using coupling lens 14, travels and expands into a fan-shape, the pivot (the intersection of the two edges of the fan) corresponds to the coupling point of the guided wave (the reflection point) 18.

If the refractive index ($n_a$) of each core 12 of the waveguide is 1.492; the refractive index ($n_c$) of each cladding 11 of the waveguide is 1.480; and the NA of coupling lens 14 (i.e., $NA_L$) agrees with the NA of the waveguide ($NA_{WG}=\sqrt{(n_a^2-n_c^2)}$) and thus $NA_L=0.19$, then guided wave 17 travels and expands at approximately 14.6°, as shown in the part (b). As for a single coupling point, light only travels within the fan defined by approximately 14.6°. That is, data recorded in the area other than the fan-shaped portion cannot be retrieved and thus that area cannot be efficiently used.

Data capacity (M) of the hologram of a layer is approximately given by $M=S/\lambda^2$, where S means the area where the hologram exists and $\lambda$ indicates the wavelength to be used, while the data capacity of a hologram is limited according to the number of pixels of the light-receiving element. Here, it is assumed that $\lambda=680$ nm and a CCD having 200 million pixels is used. If the hologram corresponds to a light-dark binary data image, then $S=0.92$ mm$^2$, while if the hologram corresponds to a 8-bit gray scale image, then $S=7.4$ mm$^2$. In each case, it is clear that using an area larger than the above area (S) is redundant. The above calculated area is much smaller than the visiting (or credit) card size (54×90=4860 mm$^2$), and a card having such an extremely small size is rather inconvenient for a portable use. Another embodiment for solving the above problem will be shown below.

Second Embodiment

Figure 8:
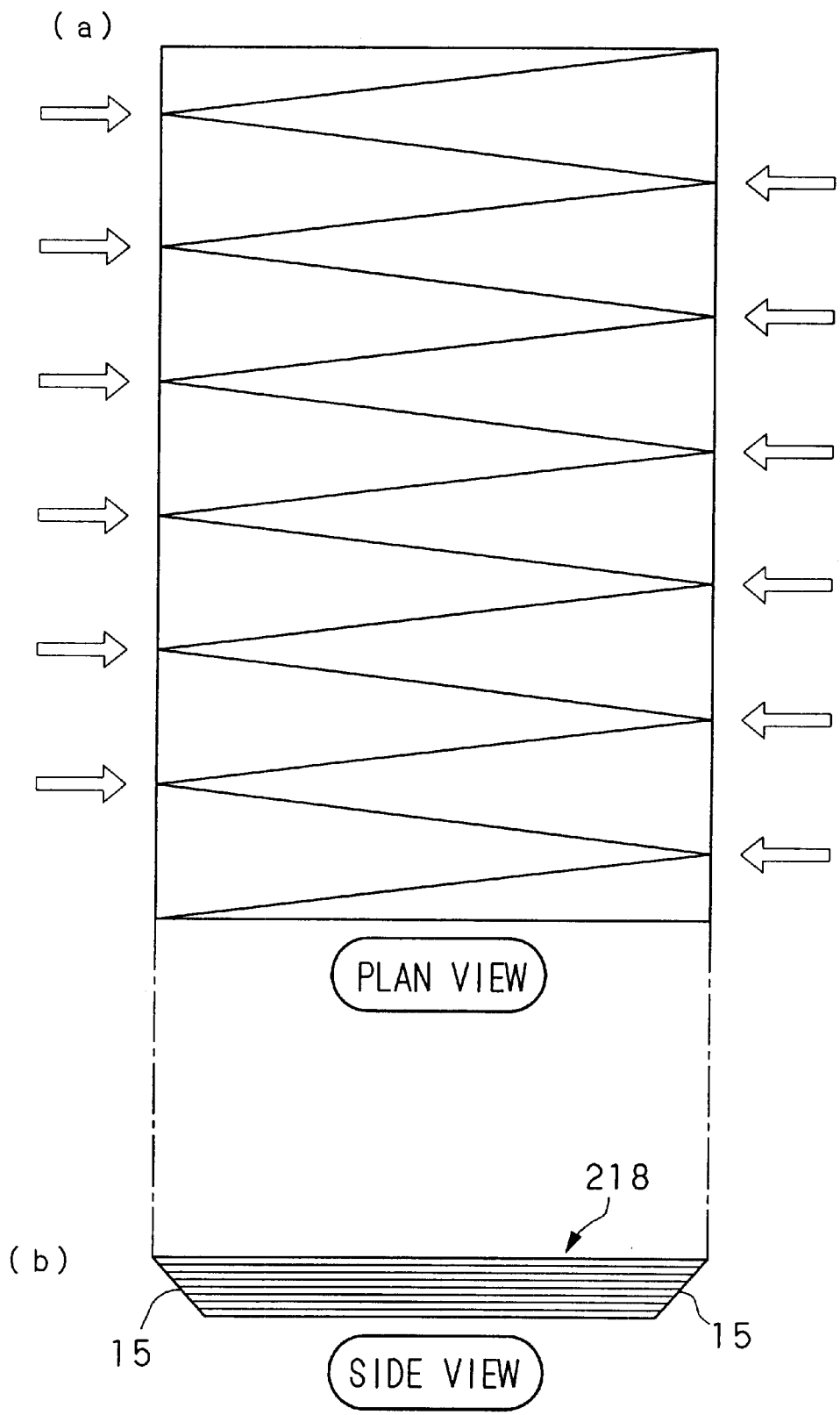
FIG. 8 is a diagram showing an arrangement in which fan-shaped waveguides are most closely arranged.

In this embodiment, a plurality of fan-shaped portions are most closely arranged in a plane, as shown in FIG. 8. In this arrangement, a pair of parallel edges 15, 15 of the slab waveguide are cut so as to be slanted by 45° with respect to the waveguide plane, and a plurality of coupling points are provided in each edge (as shown by arrows in FIG. 8). The structure in which a plurality of fan-shaped portions are alternately combined as shown in FIG. 8 is called a "block" 218, hereinbelow.

Figure 9:
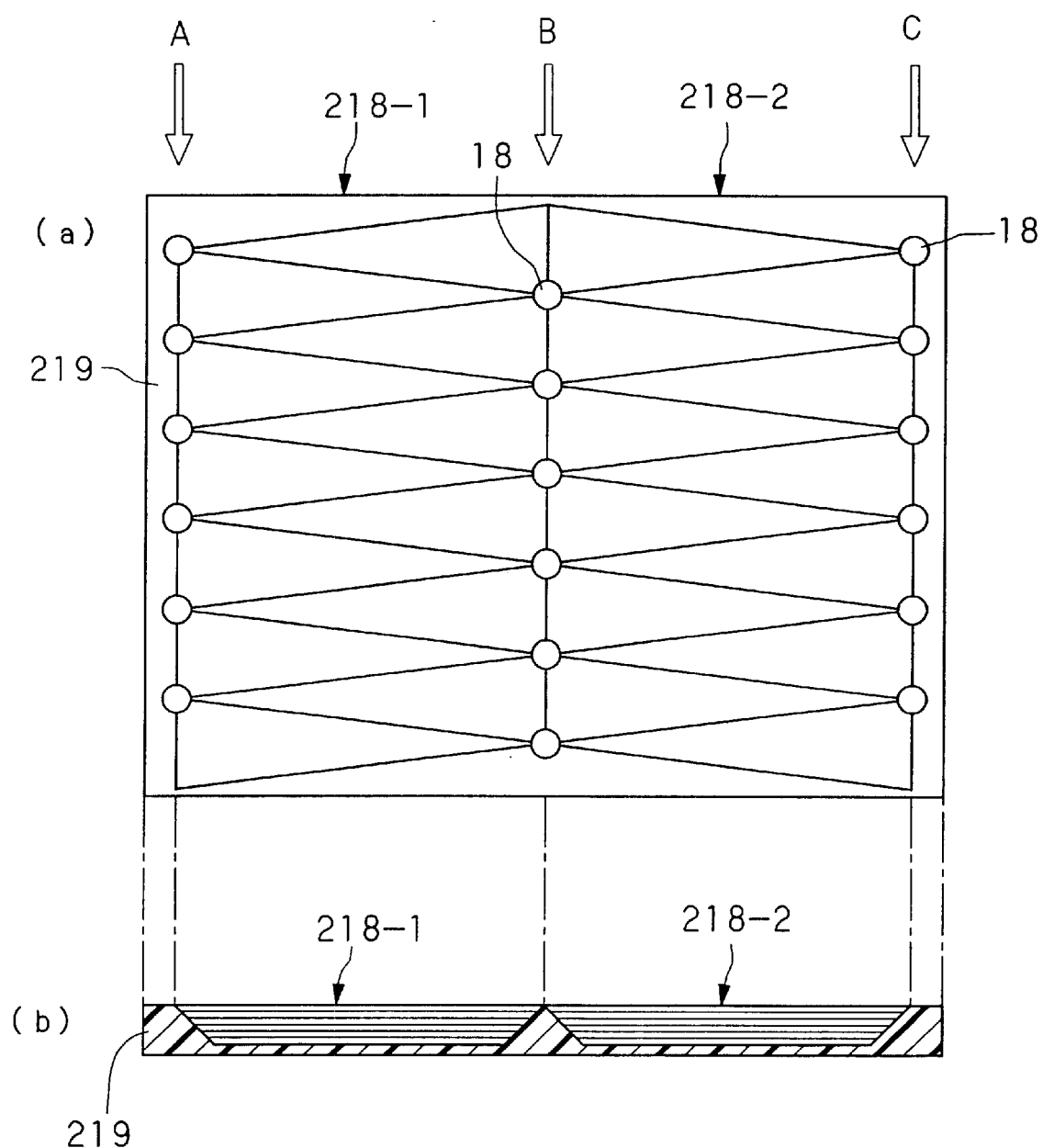
FIG. 9 is a diagram showing a card manufactured by placing blocks in the waveguide plane.

In addition, as shown in the plan (view) of part (a) of FIG. 9, it is possible to manufacture a card in which blocks 218, that is, first block 218-1 and second block 218-2, are arranged side by side.

In this case, the first block 218-1 and second block 218-2 are arranged side by side in the guided direction. Two edges of the first block 218-1, the positions of which are indicated by arrows A and B, are cut so as to be slanted by 45°, and the two edges of the second block 218-2, the positions of which are indicated by arrows B and C, are also cut so as to be slanted by 45°.

In FIG. 9, the coupling points 18 are indicated by "○". At the edge indicated by arrow B, the coupling points of the first and second blocks 218-1 and 218-2 contact each other. Accordingly, the target hologram to be retrieved can be changed by slightly shifting the relative position between the card and the coupling lens.

The guided wave which starts and travels from the pivot of the fan-shaped portion is reflected by the 45°-cut edge at the side opposite to the coupling point, and the reflected light goes out of the card and acts as stray light. The positional relationship between the hologram and the light-receiving element to which the holographic image is coupled must be carefully determined, taking into consideration that the light-receiving element must not be exposed to such stray light.

As a method for preventing stray light, the light-receiving element is positioned at the opposite side (the lower side in the side view of part (b) of FIG. 9) to the direction towards which the guided wave travels after the wave is reflected by the 45°-cut edge (the upward direction in the side view of part (b) of FIG. 9). In FIG. 9, reference numeral 219 indicates a transparent resin.

In this holographic card, the operation of converging a laser beam via a lens into a predetermined position is necessary as in the ordinary optical disc. In the optical disc, data stored in the disc face is retrieved one bit at a time, and the target bit is changed by changing the convergence point. In contrast, in the holographic card according to the present invention, the change of the convergence point leads to the change of the image (i.e., two-dimensional information data). However, the data are retrieved by changing the converging position also in this case; thus, similar to the system for the optical disc, alignment of the converging position is important in consideration of speed and accuracy of the positioning operation.

Typically, the size of each coupling point indicated by "○" in FIG. 9 is approximately 1 mm; thus, positioning must be performed in the accuracy of approximately 1 μm so as to be able to differentiate each layer. Such a positioning technique is practically and widely used at the response frequency of a few kHz for the ordinary optical disc. When the convergence point exists inside the portion "○", it is possible to chose a desired layer (or a desired block if the target coupling point exists at the edge B) inside the portion "○" with a response speed of approximately 1 ms.

Accordingly, if a plurality of coupling lenses corresponding to the number of coupling points "○" in the card are provided, any layer in any block can be accessed in approximately 1 ms.

If the number of coupling points is too large to provide the same number of coupling lenses and actuators, then the coupling lenses must be reduced (one coupling lens is always necessary). In such a case, in order to retrieve the holographic image from a desired layer of any block, a transfer mechanism must be provided with the holographic card, or a coarse adjustment mechanism for moving the coupling lens in the order of a few centimeters must be provided.

Figure 10:
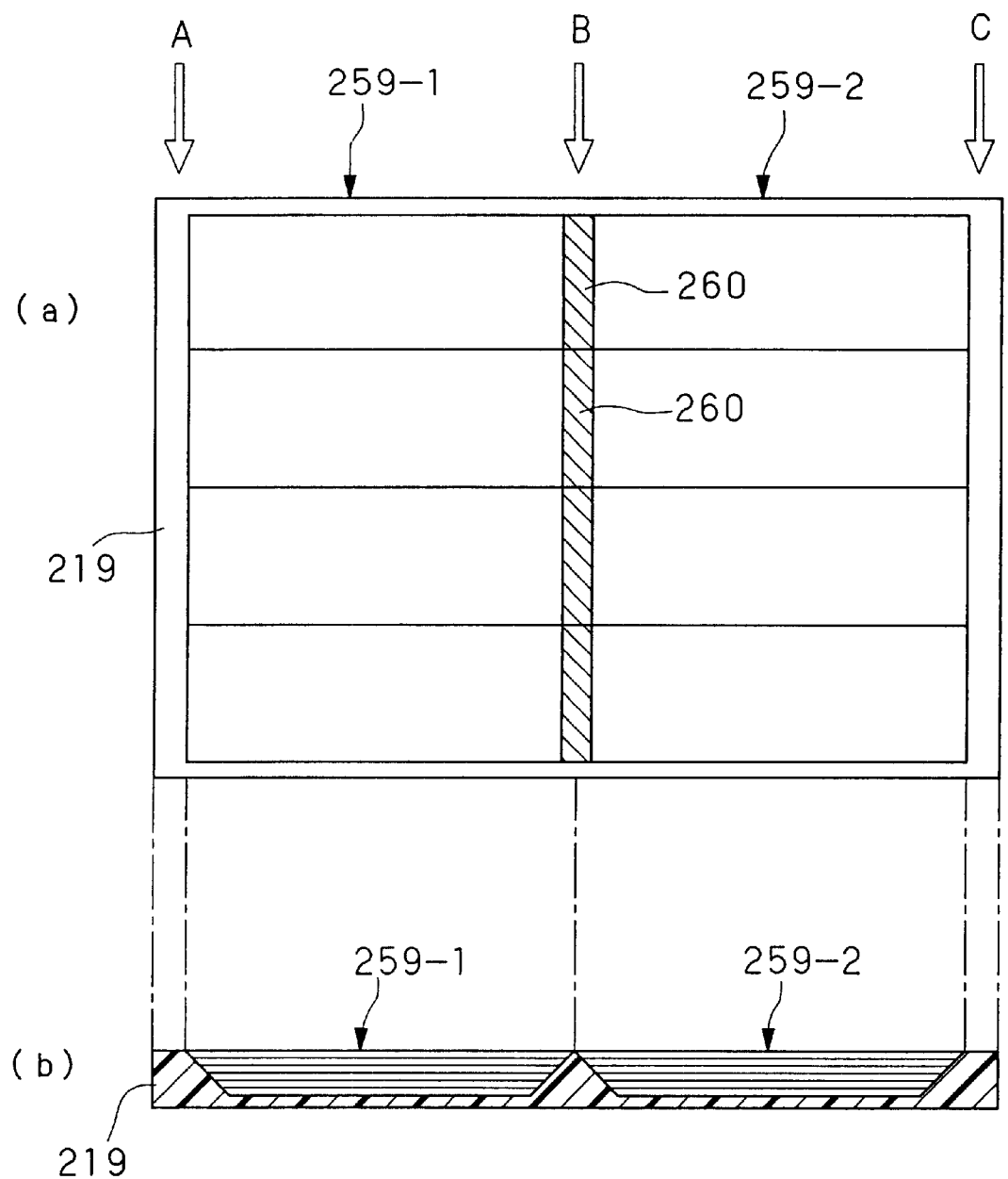
FIG. 10 is a diagram showing another card manufactured by placing blocks in the waveguide plane.

FIG. 10 shows an example arrangement using a plurality of blocks and a cylindrical lens as lens 14. In the figure, part (a) shows a plan view while part (b) shows a side view. Each of the first block 259-1 and the second block 259-2 has four rectangular areas, and each coupling portion 260 is provided between two adjacent rectangular areas of the two blocks. As shown in part (b), both edges of each rectangle area are cut so as to be slanted by 45°, as in the case of the above-described fan-shaped arrangement. Also in the present structure, adjacent coupling portions of both blocks contact each other along the edge B; thus, data stored in an area belonging to the other block can be retrieved by slightly changing the convergence position. In addition, the present arrangement has an advantage that each coupling portion can be much more easily positioned and the data retrieval mechanism can be much more easily driven in comparison with the fan-shaped arrangement.

Figure 11:
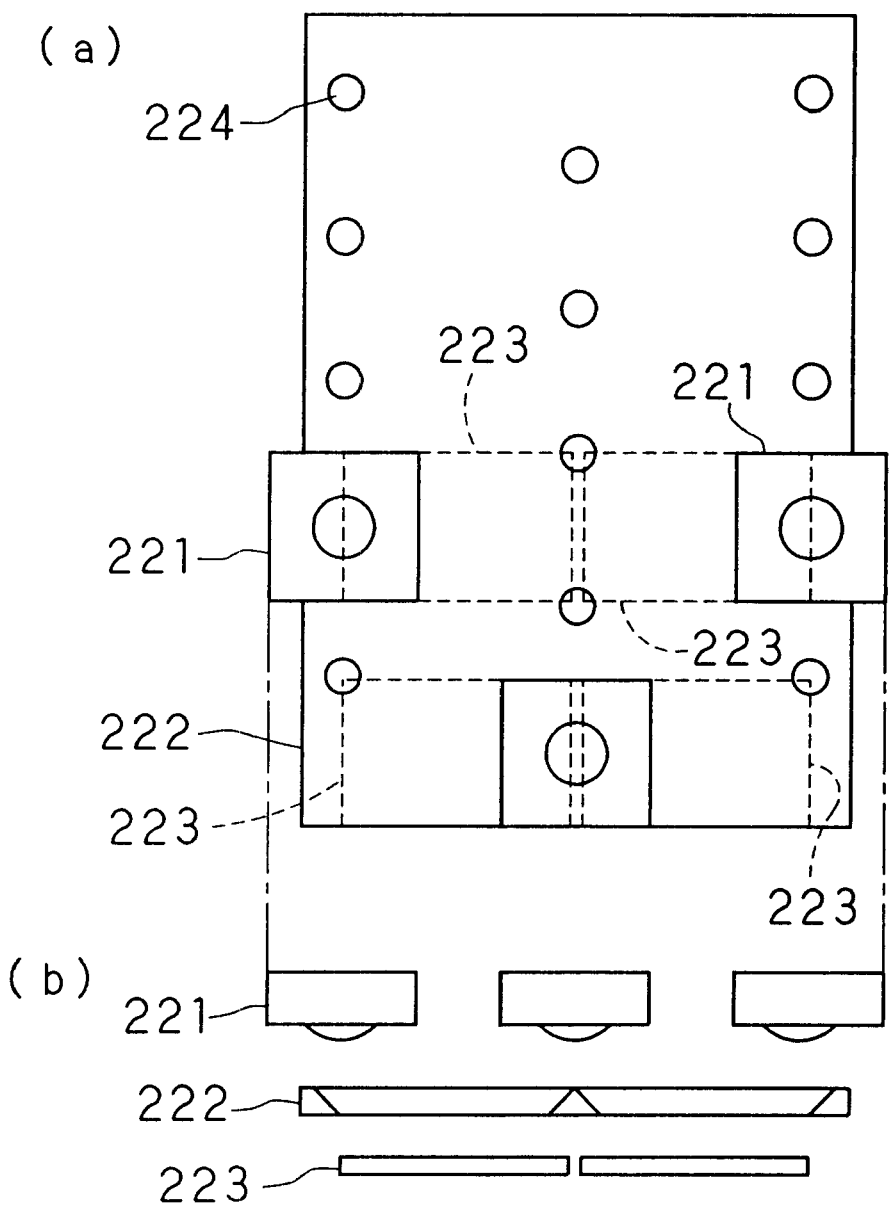
FIG. 11 is a diagram explaining a method of retrieving data by using a plurality of coupling lenses and light-receiving elements.
Figure 12:
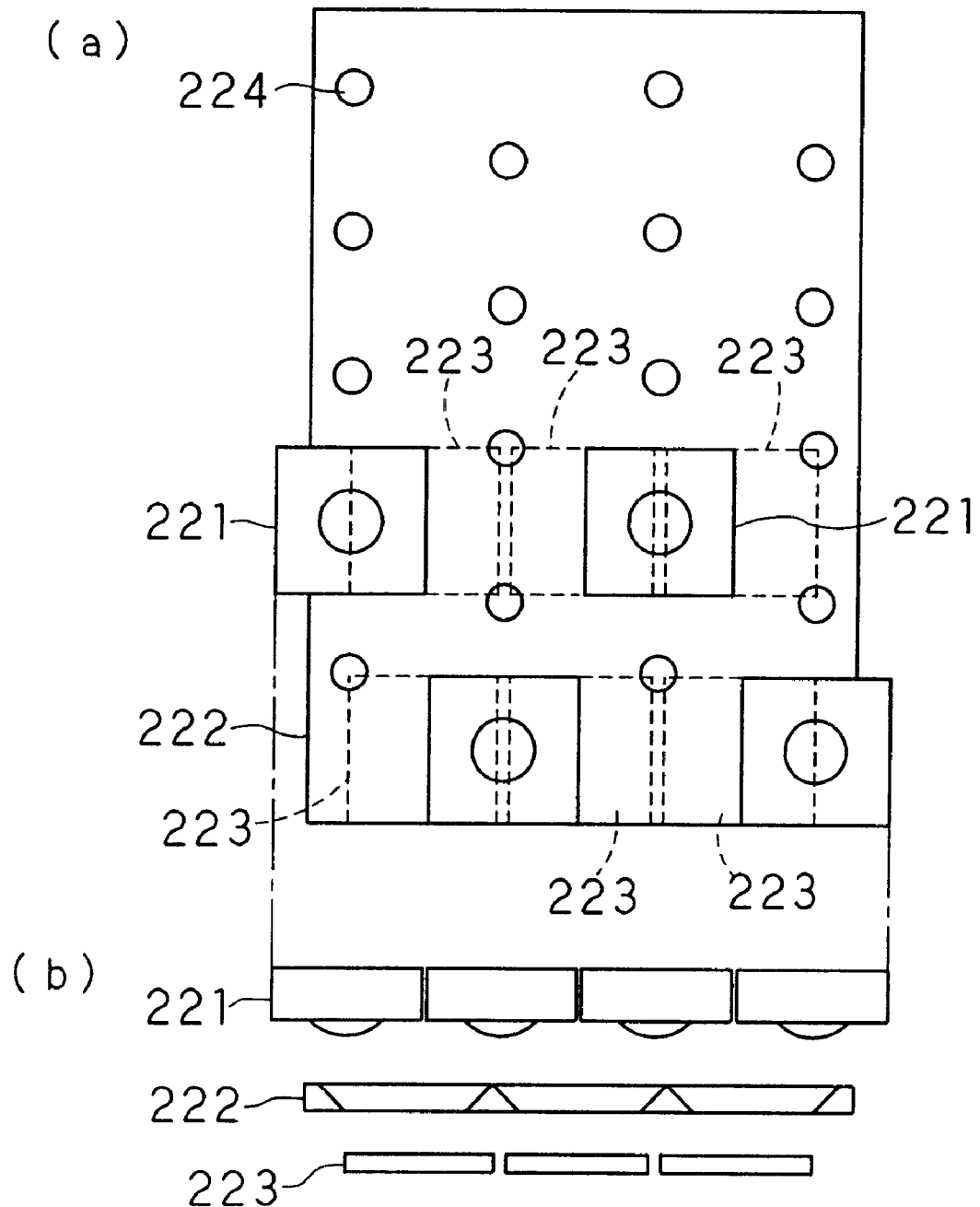
FIG. 12 is also a diagram explaining a method of retrieving data by using a plurality of coupling lenses and light-receiving elements.

FIGS. 11 and 12 show example arrangements of the holographic memory card, light-receiving elements, and coupling lenses, in which a plurality of coupling lenses, the number of which is larger than the number of blocks by 1, are provided.

FIG. 11 shows a read-only memory card having two blocks while FIG. 12 shows a read-only memory card having three blocks. In each figure, part (a) shows a plan view while part (b) shows a side view.

Each optical head 221 comprises a laser, a coupling lens, and an actuator, and a light-receiving element 223 such as a CCD is arranged corresponding to each head 221.

If the optical head 221 exists above the edge between the two blocks, two light-receiving elements 223 are provided for one optical head 221. In FIGS. 11 and 12, reference numeral 224 indicates the coupling point.

Accordingly, the target layer belonging to any block, from which the diffracted light is generated, can be changed simply by shifting the read-only holographic card 222 in a single direction (in the vertical direction in part (a) of FIGS. 11 and 12).

EXAMPLE 1

In this example, a semiconductor laser having the wavelength of 680 nm is used as a light source, a UV curable resin having the refractive index of 1.480 and the thickness of 9.3 $\mu$m is used for each clad layer, and a PMMA having the refractive index of 1.492 and the thickness of 1.7 $\mu$m is used for each core layer.

Figure 13:
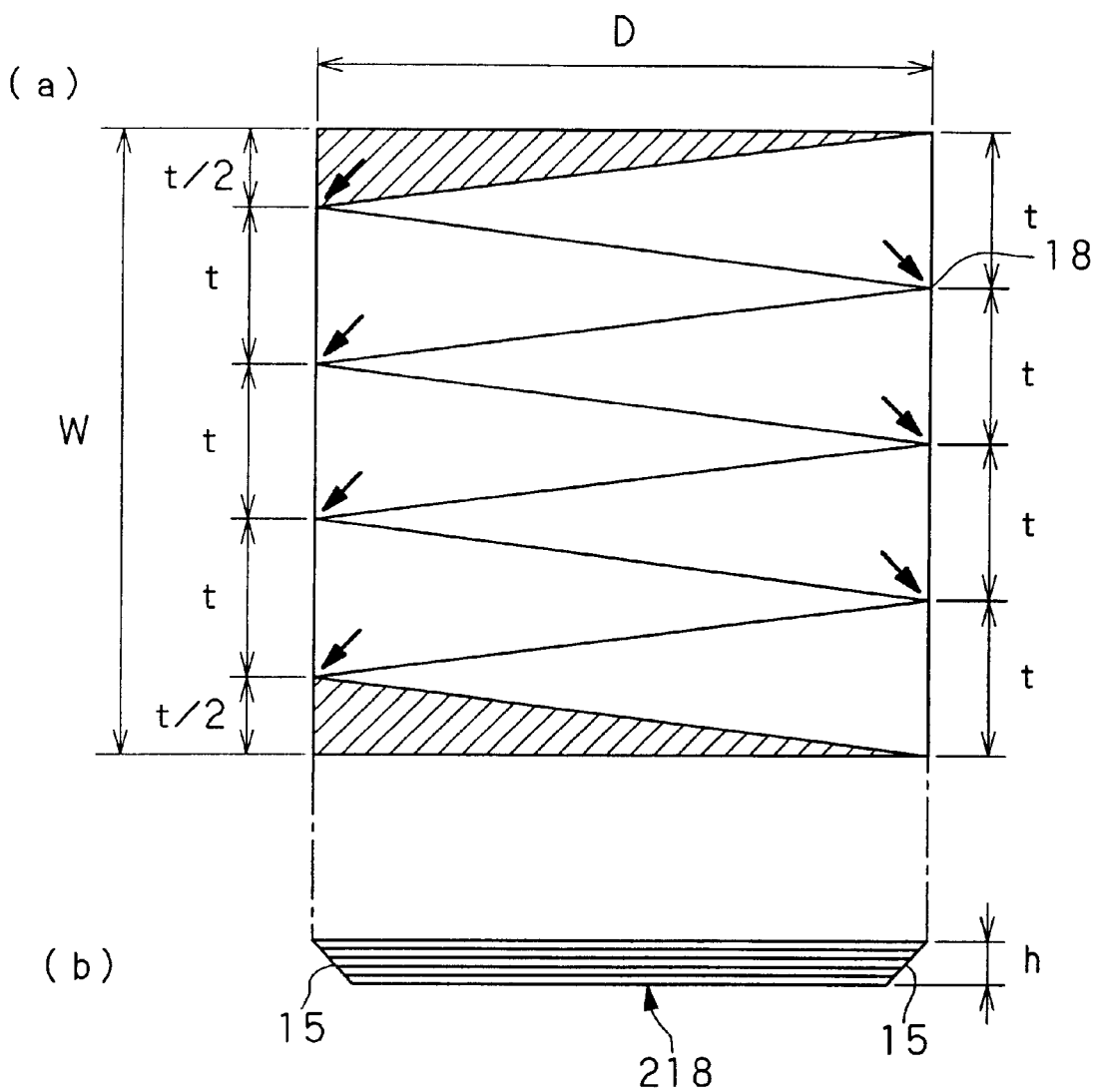
FIG. 13 is a diagram showing the structure of the holographic memory card as an example in the second embodiment.

In the multi-layered holographic memory card having the size D: 9.5 mm×W: 10 mm×h: 0.55 mm as shown in FIG. 13, opposite edges 15 and 15 are cut so as to be slanted by 45°, and coupling points are provided at intervals of t: 2.5 mm on each edge, so that the guided wave input from each coupling point does not overlap the other guided wave input from another coupling point in the waveguide plane.

In FIG. 13, no guided wave reaches the shaded or hatched areas, that is, these areas do not participate in the data retrieval of the hologram. The remaining triangular areas, which the guided waves input from each coupling point 18 (indicated by bold "black" arrows) occupy, do not overlap with each other.

When light was incident via a lens of a diameter of 5 mm and a focal length of 15 mm from different coupling points of the same layer of the holographic card having the above structure, different holographic images were retrieved while these images did not overlap with each other.

EXAMPLE 2

Figure 14:
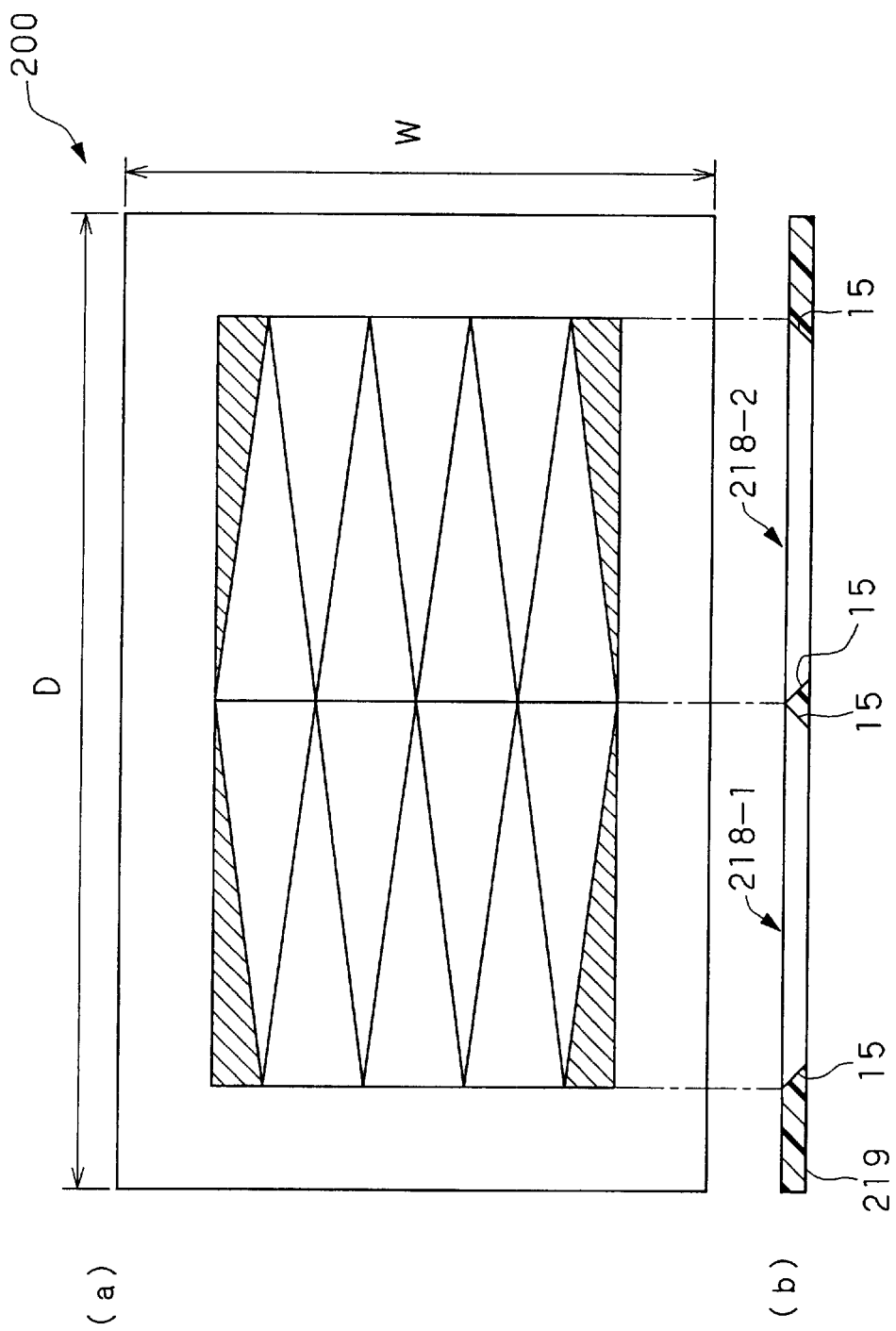
FIG. 14 is a diagram showing the structure of the holographic memory card as another example in the second embodiment.

As shown in FIG. 14, two blocks (218-1 and 218-2) are arranged side by side, each block corresponding to the multi-layered holographic memory card having the size D: 9.5 mm×W: 10 mm×h: 0.55 mm as shown in example 1. The two blocks are covered and strengthened using epoxy resin 219 so as to make a holographic card 200. Gold is vapor-deposited on the 45°-cut edges of each block to approximately 200 nm (thickness). In order to improve the mechanical strength of the card, the area covered by epoxy resin 219 is larger than the total size of the two blocks, and the card size is 25 mm×15 mm×0.55 mm.

When light was incident via a lens of a diameter of 5 mm and a focal length of 15 mm from different coupling points of the same layer (of the same block) in the card having the above structure, different holographic images are retrieved.

The arrangement according to the above second embodiment has many coupling points and the interval thereof is a few millimeters. Therefore, if a retrieval device having a single head including a light source and a two-dimensional detector is used, the head must be linearly moved so as to change the coupling point to be accessed. The structure of the mechanical device for linear movement with a high accuracy is generally complicated and the operation speed thereof is limited; thus, the performance of the device affects the data-retrieval speed. The problem of the access speed can be solved by employing many heads in the retrieval device; however, the structure of the device is very complicated and the required cost is higher in this case.

In order to solve the above problem that either many heads must be provided or the card must be linearly moved, the following embodiment will be shown, by which necessary linear motions are reduced and the access speed is greatly improved by using only a single head, and the structure can also be simplified.

Third Embodiment

Figure 15:
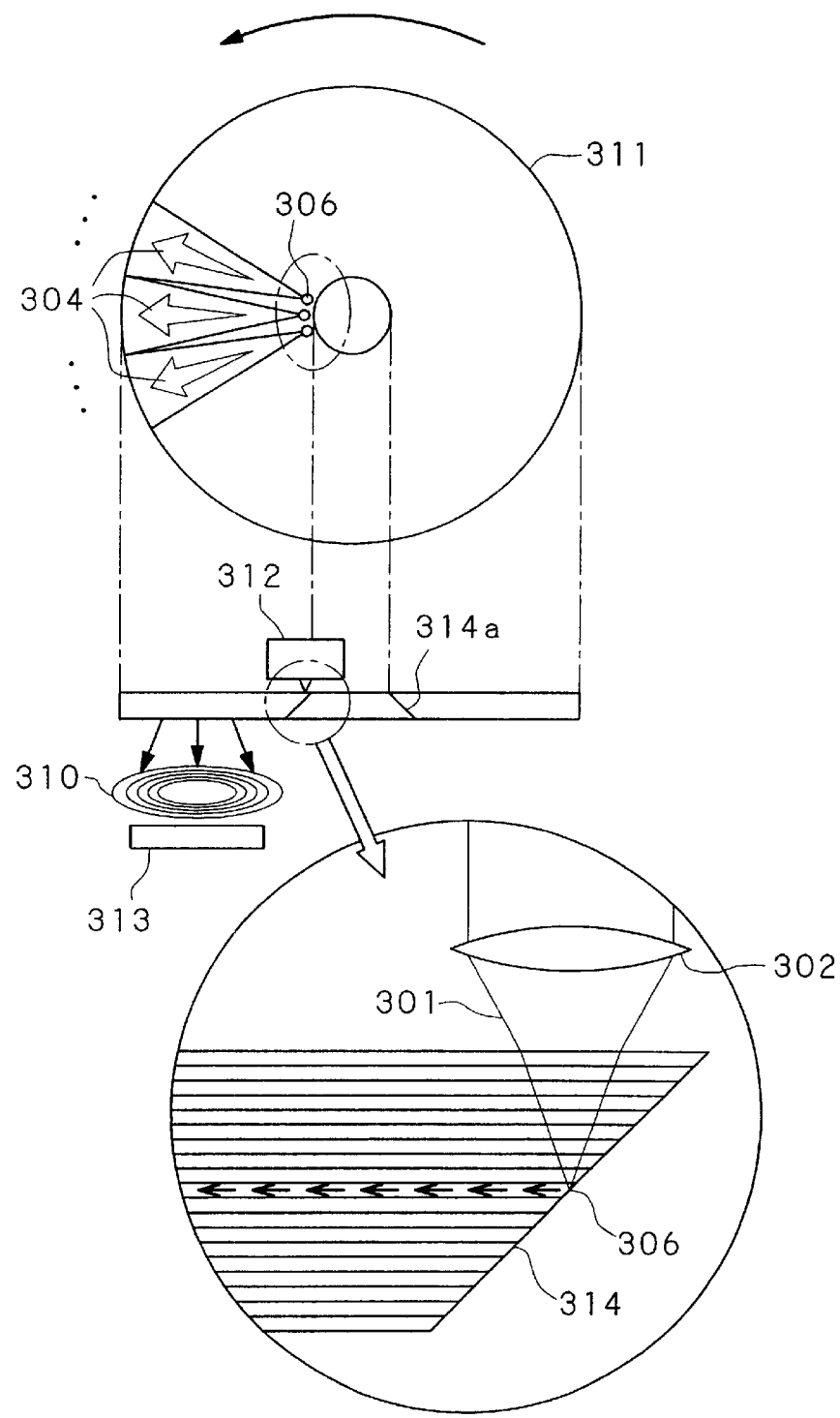
FIG. 15 is a diagram explaining the disc memory and the data retrieval method in the third embodiment.
Figure 16:
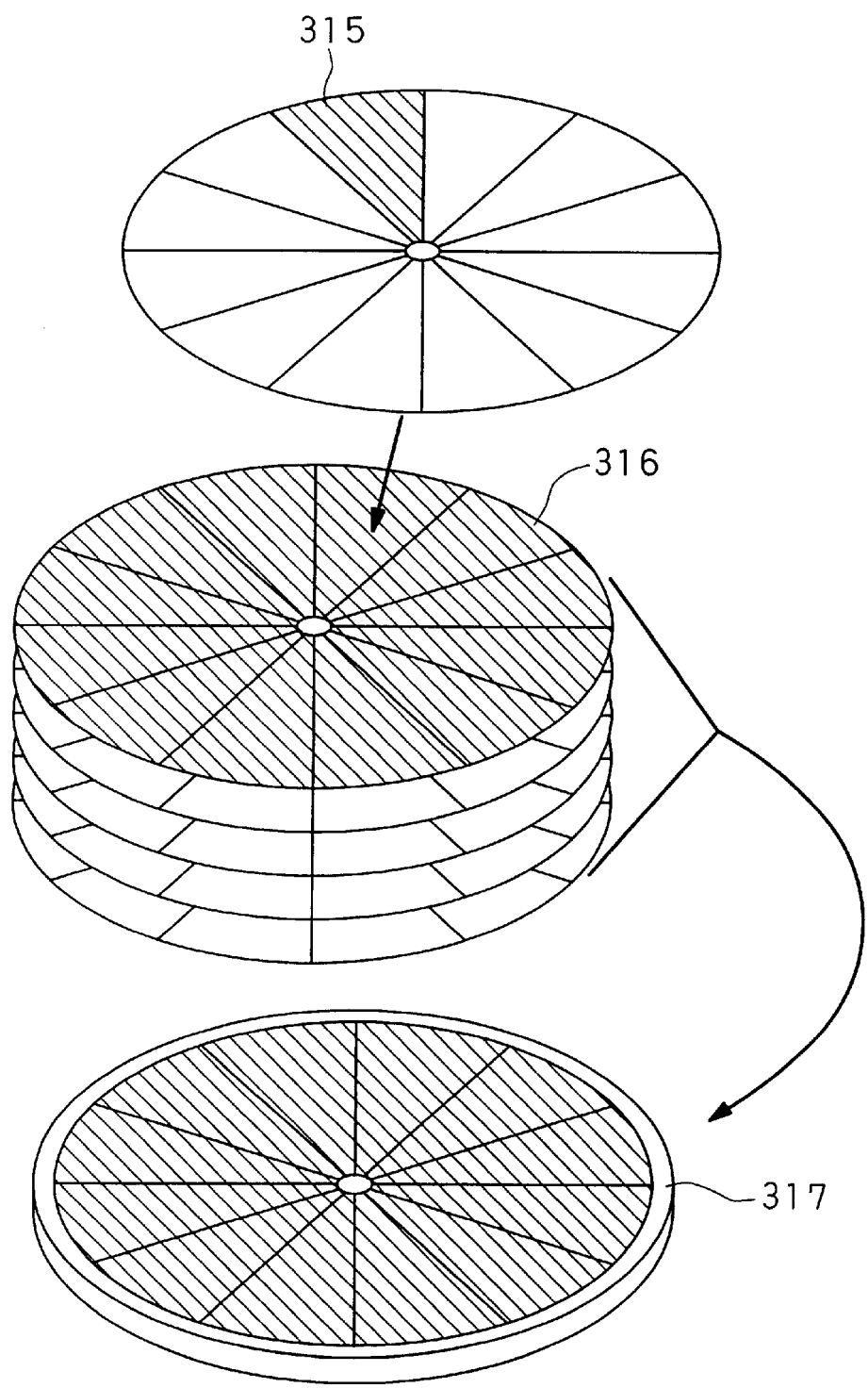
FIG. 16 is a diagram explaining the unit for storing data in the memory of the third embodiment.

FIG. 15 is a diagram explaining the disc-shaped memory (abbreviated to "disc memory", hereinbelow) and the data retrieval method in the present embodiment. FIG. 16 is a diagram explaining the unit for storing data in the memory of the present embodiment.

In these figures, reference numeral 301 indicates a laser beam, reference numeral 304 indicates guided waves, reference numeral 306 indicates a coupling point, reference numeral 310 indicates a holographic image, reference numeral 311 indicates a disc memory, reference numeral 312 indicates a light source, reference numeral 313 indicates a two-dimensional detector, reference numeral 314 indicates a 45°-slanted conical (i.e., cone-shaped) reflecting surface, reference numeral 315 indicates a sector, reference numeral 316 indicates a stratum, and reference numeral 317 indicates a disc.

The disc memory 311 according to the present invention has a doughnut shape, as shown in FIG. 15. In order to provide coupling points 306 with laser beam 301, a central portion of the disc is opened so as to produce a 45°-slanted conical hole defined by an inverted section of a cone, designated 314a. The 45°-slanted conical surface is polished so as to provide reflecting surface 314.

As shown in FIG. 15, the radius of each fan-shaped area where the hologram is recorded is a little smaller than the real radius of the disc memory 311. Therefore, a "gap" area of the data distribution is generated between two adjacent fan-shaped areas, and the effective data-storage density is decreased. The smaller the difference between the radii of the fan-shaped area and the disc, the smaller the ratio of the area of such gaps to the total disc area. That is, the shorter the distance between the coupling point 306 and the center of the disc, the better the data-storage density. Therefore, preferably, the center hole has the smallest possible radius.

Here, the means for coupling light from the outside to the waveguide is not limited to the above-explained 45°-slanted reflecting mirror surface.

Hereinbelow, a fan-shaped portion having the multi-layered structure is called "sector" 315, as in the magnetic disc. A plurality of sectors 315 having the same layers and corresponding to one rotation are called stratum 316. Furthermore, a set of strata 316 is called a disc 317.

The relationship between sector 315, stratum 316, and disc 317 is shown in FIG. 16.

Data fully stored in a sector 315 can be retrieved using one or more two-dimensional detectors at a time, and data fully stored in a stratum 316 can be retrieved by rotating the disc memory 311 by one round while the position of light source 312 is fixed. In addition, data fully stored in the whole disc memory 311 are included in disc 317. These relationships are shown in the diagram of FIG. 16.

In the method of manufacturing the medium, the generation of the multi-layered structure and fabrication of the hologram in a target layer are similar to those in the above-explained first embodiment. In order to complete the whole memory in the present embodiment, fan-shaped portions, each having multi-layered sectors, may be individually produced, and these portions are circularly arranged and bonded with each other. As an easier method, disc-shaped strata are first produced, and they are stacked to be multi-layered. In this case, after the waveguides are multi-layered, a center hole is provided and the opened portion is polished so as to have a conical shape. Coupling points are then provided in the polished surface. The polished surface itself functions as a total reflection mirror while the surface is exposed in the air. However, a metal film made of aluminum, gold, or the like may be vapor-deposited onto the reflecting surface.

The data retrieval is performed as shown in FIG. 15.

A light source is positioned immediately above the 45°-slanted conical reflecting surface 314 on which coupling points 306 to the medium are provided.

Incident light is coupled to one of the multi-layered waveguides, and travels towards the outer circumference of the disc memory while the light is confined inside the waveguide. During this operation, the hologram provided in the waveguide (as explained above) diffracts the light towards the upward and downward directions so that holographic image 310 is generated. This image is detected using two-dimensional detector 313 (typically, a CCD) so that an electric signal representing the stored data can be obtained. The convergence position of the light from light source 312 should be shifted when a target layer from which data are retrieved is changed. Therefore, a mechanism for performing a micro-motion of convex lens 302 is necessary. The actuator used for a micro-motion of the head of an optical disc drive may be used as the above mechanism. Only a single two-dimensional detector 313 is shown in FIG. 15; however, a plurality of two-dimensional detectors may be used. Similarly, a plurality of light sources may be used for improving the access speed.

In addition, the method of rotating the disc memory is not limited, and there are a plurality of methods for selecting a target sector. For example, the disc is usually stopped, and only when data retrieval is performed, the disc is moved and rotated using a servo motor so that the target coupling point is positioned at the light source. However, in consideration of the access speed, it is preferable for the disc to always rotate with a high speed, as in the cases of the CD and the hard disc. In this case, the method of selecting the sector is important, and the method used for the conventional CD, magnetic disc, and the like can be easily applied to the present memory. For example, a synchronous signal may be included in the hologram, or a physical mark provided in the medium. These methods have been applied to the conventional magnetic discs. In addition, a remarkable merit as for the disc-shaped memory is the leakage of light of the guided wave from the outer circumference of the disc. As described above, in the multi-layered holographic read-only memory card, it is necessary to have a low diffraction efficiency with respect to the hologram of each layer, so as to depress crosstalk between adjacent layers. Accordingly, most parts of the guided wave are absorbed or scattered at the outer circumference of the fan-shaped portion, or transmitted to the outside. Therefore, there is a synchronous method of extracting and using such a non-diffracted portion of the guided wave. This extracted portion of the guided wave has a power much higher than that of the holographic image; thus, it is much more advantageous than using a hologram which itself includes a synchronous signal.

EXAMPLE 1

Figure 17:
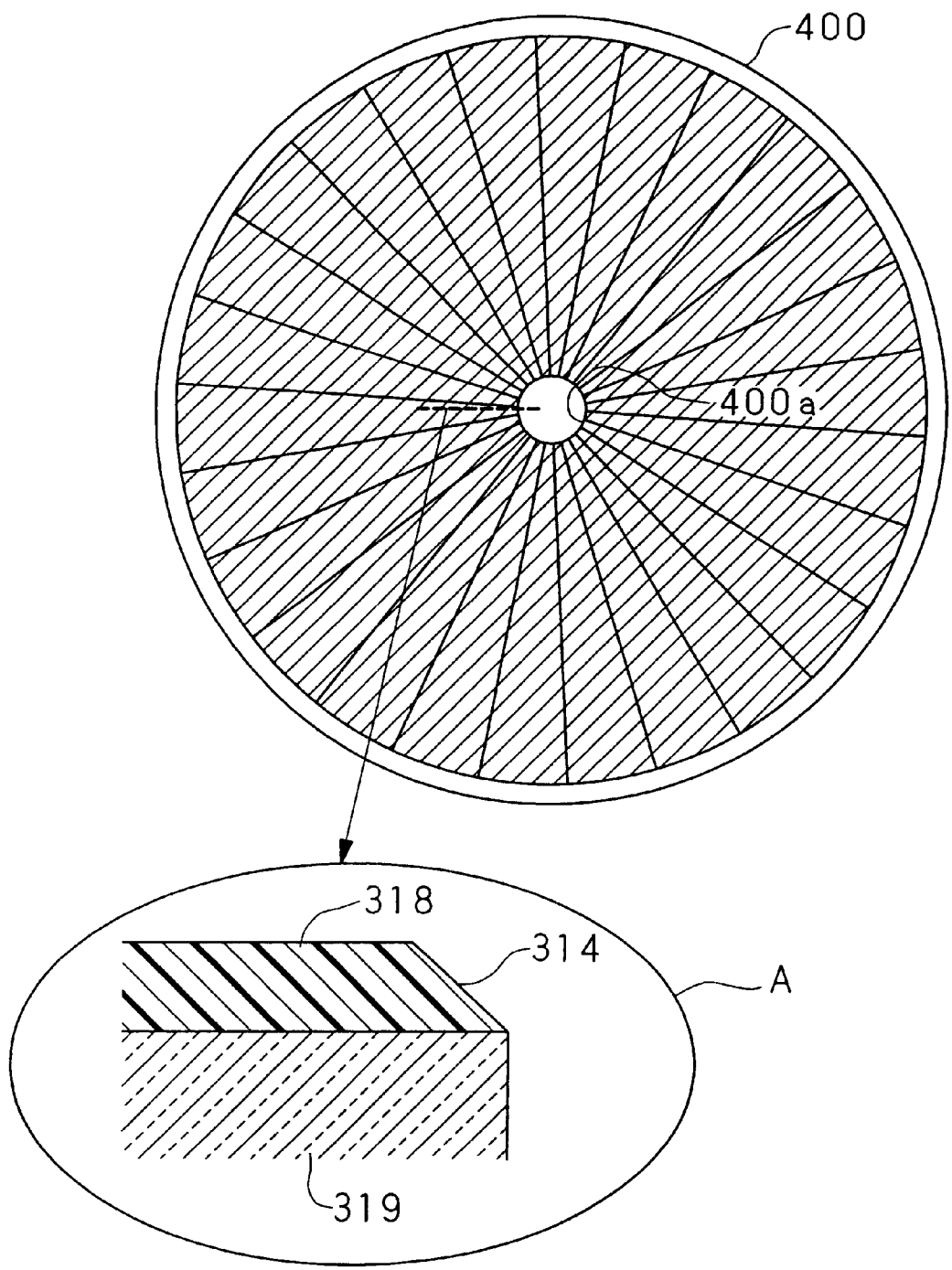
FIG. 17 shows the disc memory as an example in the third embodiment.

FIG. 17 shows a disc memory 400 manufactured according to the present invention.

As shown in the figure, in this memory, the waveguides are multi-layered on glass substrate 319. Reference numeral A indicates a sectional view of the part indicated by a dashed line. This memory has a central hole 400a having the diameter of 1 mm, and the edge 314 of the multi-layered waveguide 318 has a 45°-slanted conical shape. A hologram is fabricated in a shaded part of the diameter of 22 mm in the disc. Here, a stratum consists of 24 sectors, and 10 layers are deposited. All together, data corresponding to 10 strata and 240 sectors are recorded.

The manufacturing method was as follows. First, 10 plates of the metal mold having a concavo-convex pattern of a hologram were prepared. One plate of the metal mold corresponds to one stratum. Next, on a glass disc 319 having the diameter of 23 mm, a plurality of waveguides were multi-layered, the cladding being made of a UV curable resin having the refractive index of 1.480 while the core being made of a PMMA having the refractive index of 1.492. In the depositing operation, the substrate was first spin-coated with the UV curable resin and further spin-coated with the PMMA, and an ultraviolet ray was uniformly radiated. Then, the plate of the metal mold for the first stratum was pushed onto the coated surface so as to transfer the hologram. The above series of operations such as spin-coating of the UV curable resin, spin-coating of the PMMA, radiation of the ultraviolet ray, and transfer of the hologram for the target stratum was repeatedly performed. Finally, one more clad layer was deposited so as to cover the whole portion, and a multi-layered optical waveguide comprising 10 layers could be obtained. The average thickness of each core layer was 1.7 μm while the thickness of each cladding was 9.3 μm.

After the above processes, a hole having the diameter of 1 mm was provided in a central area, as shown in FIG. 17, the hole surface corresponding to waveguide layers was processed to have a 45°-slanted conical shape and was polished using a diamond saw. Subsequently, aluminium was vapor-deposited onto the slanted portion so as to produce an aluminium reflecting film. The reflecting film was covered using a resin, and then an attachment for rotating the disc was equipped.

The memory (of the diameter of 23 mm) storing image data of 10 strata and 240 sectors was obtained via the above-explained processes.

The image data stored in the above-manufactured disc memory were retrieved using the system shown in FIG. 15. However, FIG. 15 is not illustrated in proportion, and the dimensional ratio of each part does not always correspond to the real ratio.

A collimated semiconductor laser beam of the wavelength of 680 nm was converged by a lens having a diameter of 5 mm and a focal length of 13 mm, at the slanted portion of the waveguide layer, that is, at the target coupling point. The lens was moved in the upward, downward, left and right directions by using a micro-motion actuator so that the convergence point agreed with the coupling point of the first layer counted from the surface of the medium. Accordingly, an image recorded in one of the 240 sectors in the memory was retrieved.

While the disc memory was finely rotated, a rotation angle at which the image was most clearly retrieved was found. At this angle, accurate image data could be retrieved using the two-dimensional detector (here, a CCD).

When the disc memory was further rotated by approximately 15°, an image other than the above-retrieved image was retrieved, that is, data stored in the next sector could be retrieved. After that, every time the disc memory was further rotated by approximately 15°, another image was retrieved. According to the above operations, data stored in 24 sectors, that is, data of one stratum could be retrieved.

Similar operations ware performed after the convergence point of the laser beam was shifted to the coupling point of the second layer, thereby retrieving data stored in the second stratum. Every time the coupling point (i.e., target layer) was changed, data of one stratum were retrieved. All together, image data stored in 240 sectors of 10 strata were accurately retrieved via 10 coupling points.

EXAMPLE 2

Figure 18:
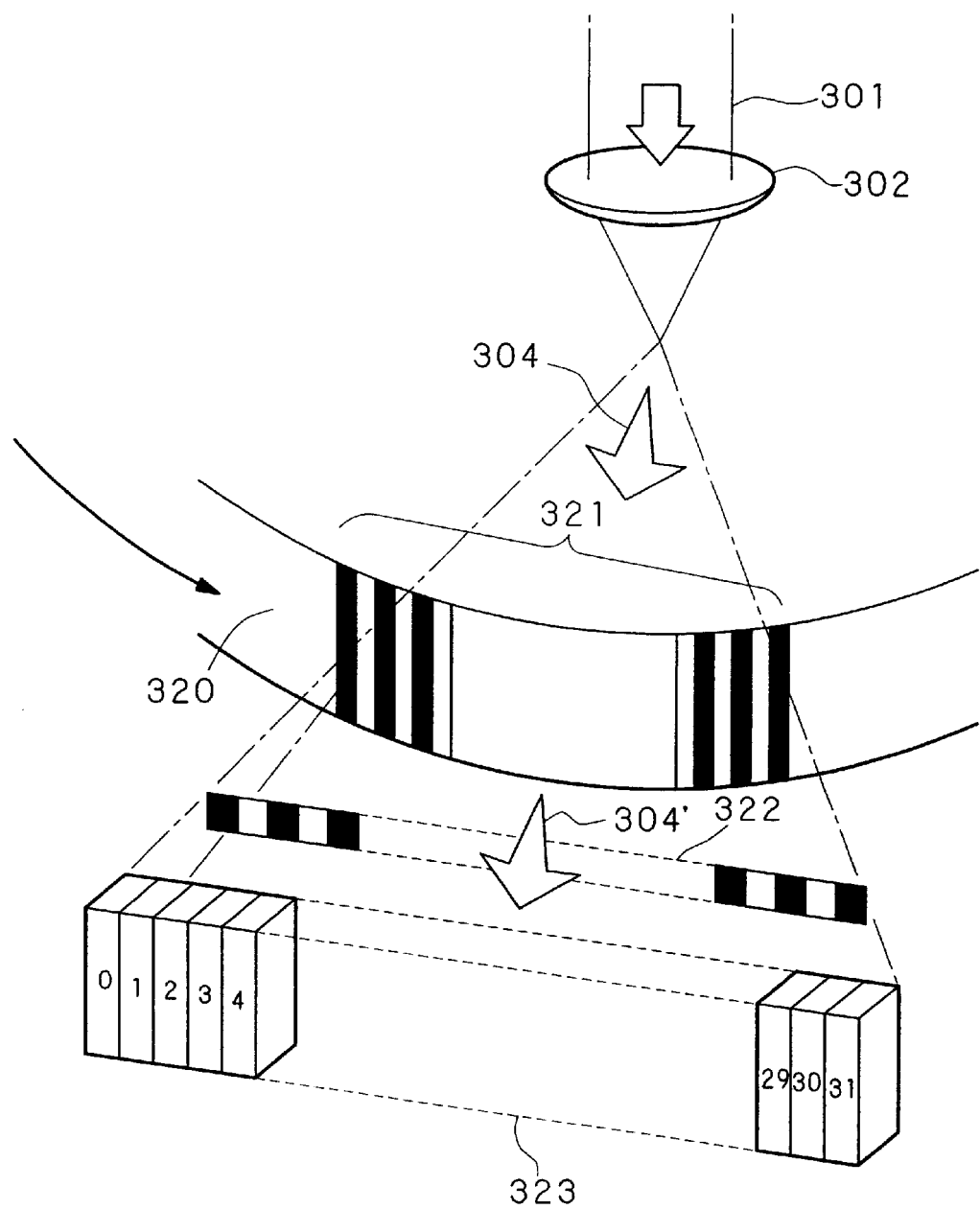
FIG. 18 is a diagram explaining an example synchronous method when retrieving data.

As shown in FIG. 18, synchronous mask sequence 321 was provided in the side face 320 of the disc memory. In this mask sequence, a binary bit indicates whether light is transmitted, and a set of 32 bits (i.e., 2 words) is provided. Each set corresponded to a fan-shaped portion having 10 multi-layered sectors, and was placed at the arc of the relevant fan-shaped portion.

Accordingly, synchronous mask sequence 321 had a total of 32×24 bits (i.e., 2×24 words). Among 32 bits corresponding to one fan-shaped portion, the upper 10 bits were assigned to signal synchronization, while the lower 5 bits were assigned to sector identification. The 10 bits for signal synchronization has a bit sequence "0101010101" for all 24 sets. In addition, numbers from 0 to 23 were respectively assigned to the above 24 fan-shaped portions, and these numbers were reflected in the 5 bits for sector identification of the synchronous mask sequence 321 provided to the target fan-shaped portion. A laser beam was input and coupled to a sector of the disc memory, to which the synchronous mask sequence 321 was added as described above, by using a data retrieval system as shown in FIG. 15.

As explained above, the largest part of the guided wave 304 was leaked from the side face 320 of the disc memory to the outside (see reference numeral 304'); thus, optical pattern 322 corresponding to the synchronous mask sequence 321 was observed near the side face of the disc memory, and was detected using one-dimensional detector 323 so that the pattern of the synchronous mask sequence 321 could be detected.

Here, the signal of the one-dimensional detector 323 was monitored while the stationary rotation at approximately 70 rpm of the disc memory was performed. According to the monitoring operation, it was confirmed that the upper 10 bits for signal synchronization of the synchronous mask sequence 321 were "0101010101". Simultaneously, the lower 5 bits were detected and the image data are detected by the two-dimensional detector 313 so that data stored in a target sector and the number assigned to the fan-shaped portion to which the sector belongs could be obtained.

According to the above method, even when the stationary rotation was performed, data of the designated sector could be retrieved. The rotation speed of the disc memory was approximately 70 rpm, as described above; thus, all data stored in the disc memory were retrieved in approximately 8.7 sec at the quickest.

What is claimed is:

1. A multi-layered holographic read-only memory comprising:
    a multi-layered stack of single-mode thin-film slab waveguides; and
    a core layer and a clad layer provided in each slab waveguide, said core layer and clad layer having a periodic scattering center whose period approximately agrees with the period of the guided mode so that a guided wave in the waveguide is diffracted by the periodic scattering center to the outside of the waveguide and a holographic image is generated,
    wherein at least one of the edges of the multi-layered slab waveguide is configured so as to produce a reflecting surface which is slanted by a predetermined angle with respect to the normal direction of the waveguide plane.

2. A multi-layered holographic read-only memory as claimed in claim 1, wherein at least one of the core layer and the clad layer is made of a UV-curable resign which is processed by ultraviolet pattern irradiation to record a hologram which functions as the periodic scattering center.

3. A multi-layered holographic read-only memory as claimed in claim 1, wherein the core layer and the clad layer contain master data including a concavo-convex pattern which functions as the periodic scattering center.

4. A multi-layered holographic read-only memory as claimed in claim 1, wherein the predetermined angle is approximately 45°, such that light incident from a direction substantially perpendicular to the waveguide plane on the reflecting surface is introduced into the waveguide.

5. A multi-layered holographic read-only memory as claimed in claim 1, wherein the reflecting surface is covered with a metallic or dielectric reflecting film.

6. A multi-layered holographic read-only memory as claimed in claim 5, wherein the multi-layered slab waveguide has opposite edges which function as 45°-cut reflecting surfaces, and guided waves incident from these edges do not overlap with each other in the relevant waveguide plane.

7. A multi-layered holographic read-only memory as claimed in claim 6, wherein a plurality of the multi-layered slab waveguides are arranged in the waveguide plane.

8. A multi-layered holographic read-only memory as claimed in any one of claims 1–3, wherein a plurality of the multi-layered slab waveguides are arranged in the waveguide plane.

9. A method for retrieving data stored in disc-shaped memory comprising:

providing a multi-layered holographic read-only memory comprising a multi-layered stack of single-mode thin-film slab waveguides having a core layer and a clad layer provided in each waveguide, said core layer and clad layer having a periodic scattering center whose period approximately agrees with the period of the guided mode so that a guided wave in the waveguide is diffracted by the periodic scattering center to the outside of the waveguide and a holographic image is generated, the multi-layered holographic read-only memory further having a plurality of coupling points for introducing light, wherein at least one of the core layer and the clad layer is made of a UV curable resin and a hologram is recorded by the ultraviolet pattern irradiation, and the recorded hologram functions as the periodic scattering center;

providing a specific identification pattern for each coupling point at an area of the side face of the disc, the guided wave from the coupling point being transmitted through said area;

rotating the multi-layered holographic read-only memory; and detecting the identification pattern so as to establish a synchronous condition with respect to the relevant coupling point.

10. A multi-layered holographic read-only memory comprising:

a multi-layered stack of single-mode thin-film slab waveguides; and a core layer and a clad layer provided in each slab waveguide, said core layer and clad layer having a periodic scattering center whose period approximately agrees with the period of the guided mode so that a guided wave in the waveguide is diffracted by the periodic scattering center to the outside of the waveguide to thereby generate a holographic image, wherein a plurality of the multi-layered slab waveguides are arranged to make a disc memory, and the disc memory has a reflecting surface in a central area of the disc memory, so as to guide light introduced into the reflecting surface towards the outer circumference of the disc memory.

11. A multi-layered holographic read-only memory as claimed in claim 10, wherein:

the reflecting surface has the shape of a 45°-slanted side face of a cone, such that light incident from the direction substantially perpendicular to the disc plane on the reflecting surface is introduced into the waveguide.

12. A multi-layered holographic read-only memory as claimed in claim 11, wherein:

a plurality of coupling points for introducing light are concentrically and periodically disposed in the reflecting surface such that a guided wave is transmitted from each coupling point towards the outer circumference of the disc memory while the guided wave expands as a fan-shape having a predetermined angle of expansion, wherein the predetermined angle of expansion is determined in order that fan-shaped portions corresponding to each coupling point do not overlap with each other.

13. A multi-layered holographic read-only memory as claimed in claim 12, wherein a specific identification pattern for each coupling point is provided in an area of the side face of the disc memory, the guided wave from the coupling point being transmitted through said area.

* * * * *